US010529137B1

(12) United States Patent
Black et al.

(10) Patent No.: US 10,529,137 B1
(45) Date of Patent: Jan. 7, 2020

(54) MACHINE LEARNING SYSTEMS AND METHODS FOR AUGMENTING IMAGES

(71) Applicant: Max-Planck-Gesellschaft zur Förderung der Wissenschaften e.V., Munich (DE)

(72) Inventors: Michael Black, Tuebingen (DE); Eric Rachlin, Brooklyn, NY (US); Evan Lee, New York, NY (US); Nicolas Heron, New York, NY (US); Matthew Loper, San Francisco, CA (US); Alexander Weiss, Boston, MA (US); David Smith, Brooklyn, NY (US)

(73) Assignee: Max-Planck-Gesellschaft zur Förderung der Wissenschaften e.V., Munich (DE)

( * ) Notice: Subject to any disclaimer, the term of this patent is extended or adjusted under 35 U.S.C. 154(b) by 38 days.

(21) Appl. No.: 15/826,389

(22) Filed: Nov. 29, 2017

Related U.S. Application Data

(60) Provisional application No. 62/427,593, filed on Nov. 29, 2016.

(51) Int. Cl.
*G06T 19/00* (2011.01)
*G06T 7/55* (2017.01)
(Continued)

(52) U.S. Cl.
CPC ........ *G06T 19/006* (2013.01); *G06K 9/00214* (2013.01); *G06K 9/726* (2013.01);
(Continued)

(58) Field of Classification Search
CPC combination set(s) only.
See application file for complete search history.

(56) References Cited

U.S. PATENT DOCUMENTS 9,001,118 B2 * 4/2015 Molyneaux ........... A63F 13/655
345/419
9,332,208 B2 * 5/2016 Hayashi ................ G03B 17/54
(Continued)

OTHER PUBLICATIONS

Bogo, et al., Detailed Full-Body Reconstructions of Moving People from Monocular RGB-D Sequences. In International Conference on Computer Vision (ICCV), pp. 2300-2308, Dec. 2015.
(Continued)

*Primary Examiner* — Motilewa Good Johnson
(74) *Attorney, Agent, or Firm* — Knobbe Martens Olson & Bear, LLP

(57) ABSTRACT

Disclosed is a method including receiving visual input comprising a human within a scene, detecting a pose associated with the human using a trained machine learning model that detects human poses to yield a first output, estimating a shape (and optionally a motion) associated with the human using a trained machine learning model associated that detects shape (and optionally motion) to yield a second output, recognizing the scene associated with the visual input using a trained convolutional neural network which determines information about the human and other objects in the scene to yield a third output, and augmenting reality within the scene by leveraging one or more of the first output, the second output, and the third output to place 2D and/or 3D graphics in the scene.

20 Claims, 12 Drawing Sheets

(51) Int. Cl.
*G06T 7/73* (2017.01)
*G06T 15/04* (2011.01)
*G06T 7/246* (2017.01)
*G06K 9/72* (2006.01)
*G06K 9/00* (2006.01)
*G06N 20/00* (2019.01)

(52) U.S. Cl.
CPC ............ *G06N 20/00* (2019.01); *G06T 7/246* (2017.01); *G06T 7/55* (2017.01); *G06T 7/75* (2017.01); *G06T 15/04* (2013.01); *G06T 2207/20081* (2013.01); *G06T 2207/20084* (2013.01); *G06T 2207/20221* (2013.01); *G06T 2207/30196* (2013.01)

(56) References Cited

U.S. PATENT DOCUMENTS

| | | | | |
|---|---|---|---|---|
| 2009/0252423 | A1* | 10/2009 | Zhu | G06K 9/00201 |
| | | | | 382/209 |
| 2010/0002909 | A1* | 1/2010 | Lefevre | G06F 3/04815 |
| | | | | 382/103 |
| 2010/0111370 | A1 | 5/2010 | Black | |
| 2011/0267344 | A1* | 11/2011 | Germann | G06K 9/00201 |
| | | | | 345/420 |
| 2012/0105662 | A1* | 5/2012 | Staudacher | H04N 5/23222 |
| | | | | 348/222.1 |
| 2012/0218262 | A1* | 8/2012 | Yomdin | G06T 13/40 |
| | | | | 345/419 |
| 2013/0095924 | A1* | 4/2013 | Geisner | G06F 3/012 |
| | | | | 463/32 |
| 2013/0097194 | A1* | 4/2013 | Braga | G06F 16/5838 |
| | | | | 707/758 |
| 2013/0271458 | A1* | 10/2013 | Andriluka | G06K 9/00342 |
| | | | | 345/420 |
| 2015/0279098 | A1* | 10/2015 | Kim | G06T 17/20 |
| | | | | 345/420 |
| 2015/0279113 | A1* | 10/2015 | Knorr | G06T 19/006 |
| | | | | 345/633 |
| 2018/0077400 | A1* | 3/2018 | Ayari | H04N 13/271 |
| 2018/0137644 | A1* | 5/2018 | Rad | G06T 7/73 |
| 2019/0035149 | A1* | 1/2019 | Chen | G06T 15/04 |

OTHER PUBLICATIONS

Bogo, et al, Keep it SMPL: Automatic Estimation of 3D Human Pose and Shape from a Single Image, arXiv:1607.08128v1 [cs.CV] Jul. 27, 2016.
Hill, et al., Creating body shapes from verbal descriptions by linking similarity spaces. Psychological Science, to appear, 2016.
Loper, et al, SMPL: A Skinned Multi-Person Linear Model. ACM Trans. Graphics (Proc. SIGGRAPH Asia), 34(6):248:1-248:16, ACM, New York, NY, Oct. 2015.
Loper, et al, MoSH: Motion and Shape Capture from Sparse Markers, available online at http://files.is.tue.mpg.de/black/papers/MoSh.pdf; ACM Transactions on Graphics (TOG)—Proceedings of ACM SIGGRAPH Asia 2014 TOG, vol. 33 Issue 6, Nov. 2014.
Pishchulin, et al, DeepCut: Joint Subset Partition and Labeling for Multi Person Pose Estimation, arXiv:1511.06645v2 [cs.CV] Apr. 26, 2016.
Streuber, et al., Body Talk: Crowdshaping Realistic 3D Avatars with Words. ACM Trans. Graph. (Proc. SIGGRAPH), 35(4):54:1-54:14, Jul. 2016.
Weiss, et al., Home 3D body scans from noisy image and range data. In Int. Conf. on Computer Vision (ICCV), pp. 1951-1958, IEEE, Barcelona, Nov. 2011.

* cited by examiner

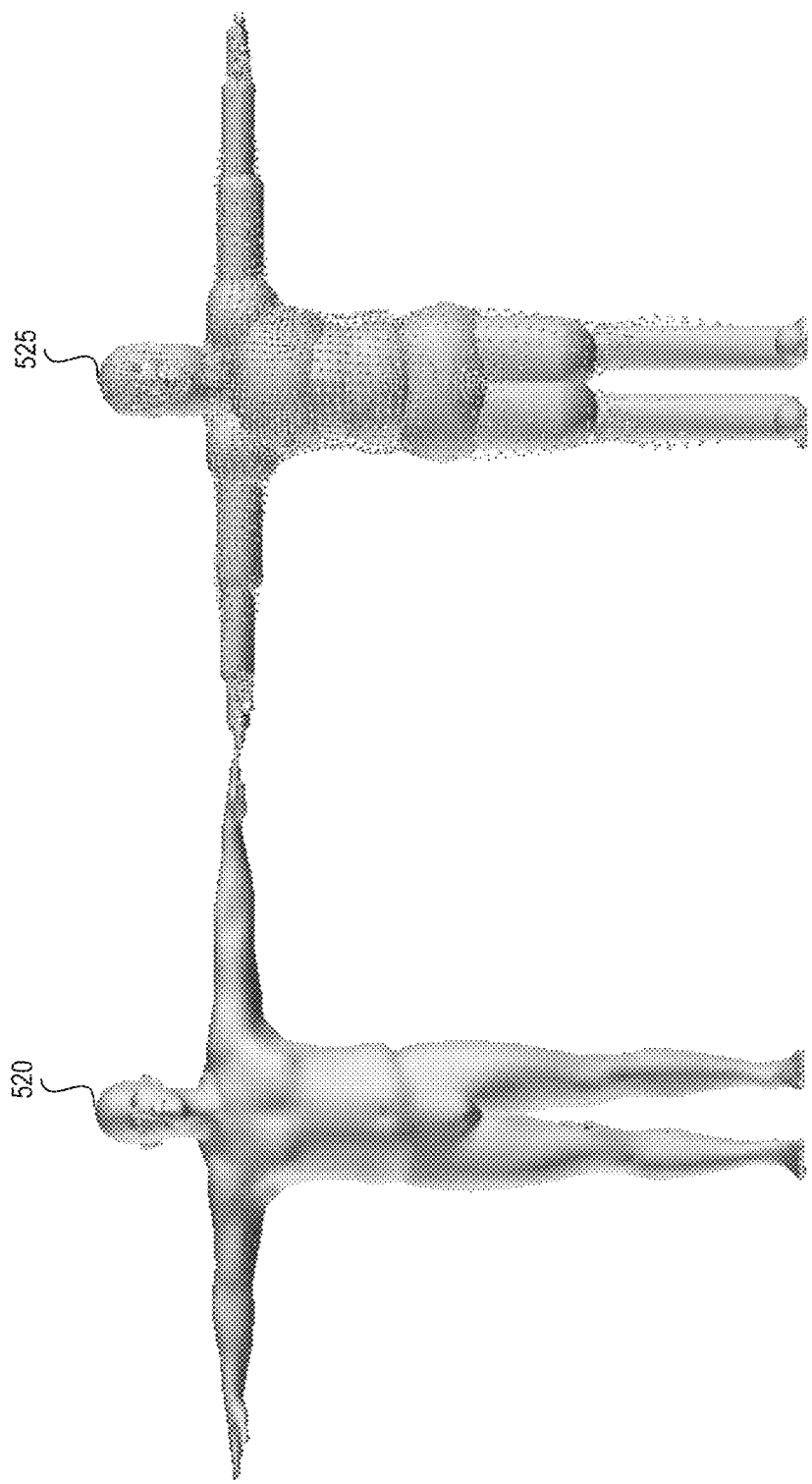

MACHINE LEARNING SYSTEMS AND METHODS FOR AUGMENTING IMAGES

BACKGROUND

Image manipulation involves transforming or altering an image, such as a photograph, using various methods and techniques to achieve desired visual effects. For example, compositing is a form of image manipulation that combines visual elements from separate sources into single images, often to create the illusion that those elements are all part of the same scene. As another example, retouching is a form of image manipulation that enhances images, for example through adjustment of colors, contrast, white balance, and sharpness, and/or the removal of noise, unwanted visual elements, and visible flaws on skin or materials.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 5B illustrates an example of a body model representation usable in the fitting process used for FIG. 5A.

DETAILED DESCRIPTION

Figure 1A:
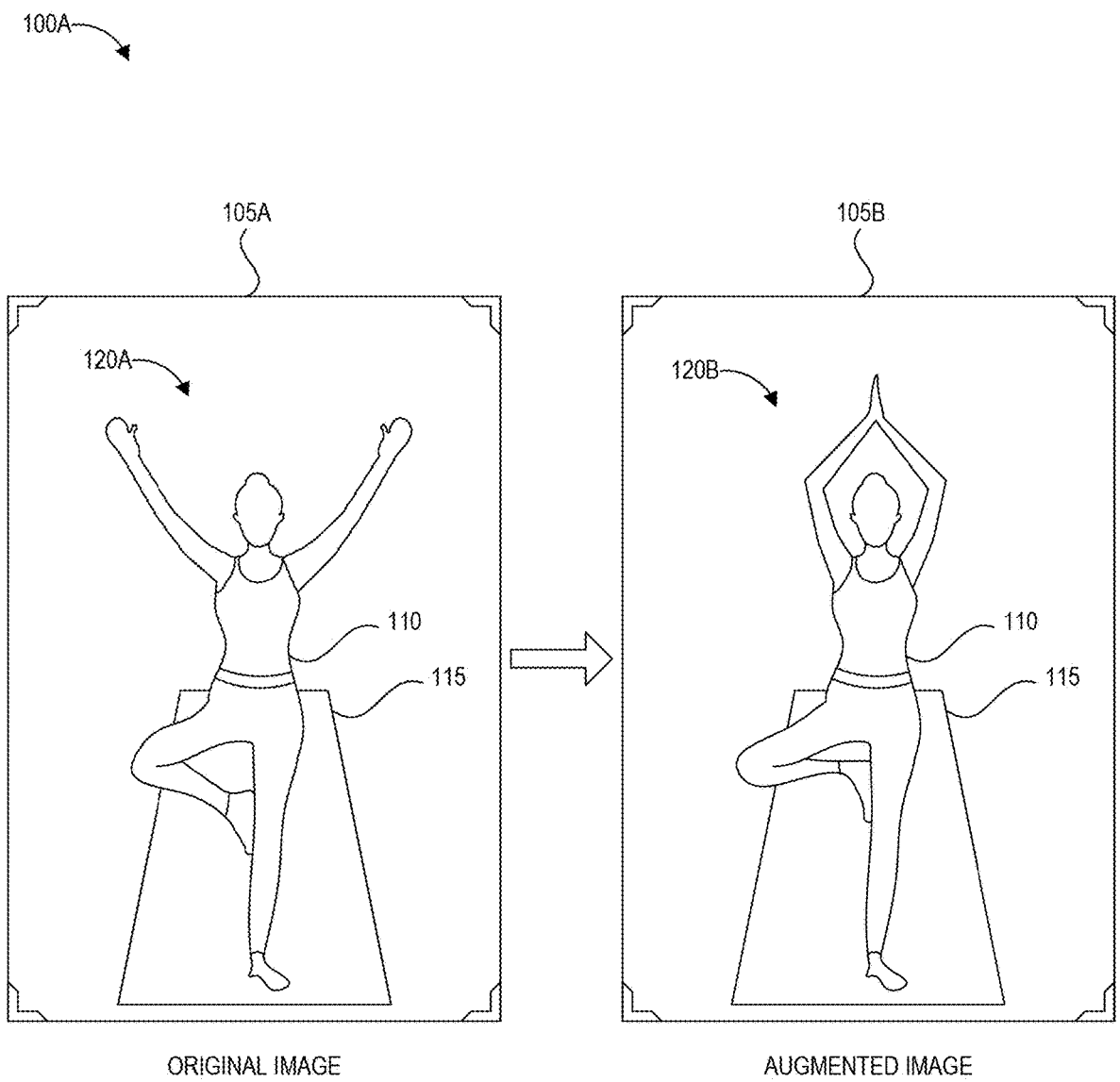
FIGS. 1A and 1B depict example original images and their corresponding augmented images that have been augmented according to the present disclosure.

The present disclosure is generally directed to using artificially intelligent machine learning systems to augment images for various purposes. For example, the disclosed machine learning system can include components that identify the pose of a human body in an image, the shape (e.g., three-dimensional ("3D") contours) of the body, and also environmental parameters of the scene (e.g., lighting conditions, shapes and locations of environmental objects). Using this information and a set of rules describing how images may be augmented, the artificially intelligent image augmentation system can create new images that are augmented versions of the originally-received images. The disclosed system generates the augmentations in a semantically meaningful fashion, which refers to the augmentations looking "realistic" and/or being contextually appropriate for the determined human body poses and shapes, and for the determined environmental parameters. For example, the disclosed augmentations blend perceptually well with the semantic image content from the input image (e.g., the depicted objects and the general scenery), at least in part due to the abilities of the disclosed machine learning models to model the semantic image content and style.

The estimation of 3D human body shape is important for many applications in the clothing industry, fitness, health, special effects, virtual reality, and video games to name a few. Body shape is often captured using expensive scanning systems (e.g., laser, stereo, structured light) or commodity depth sensors, or from sets of stereoscopic images. However, one drawback of such systems is their requirement for specialized optical devices to capture the data that is used for estimation of body shape. Further, although the output of such systems may be a 3D model of body shape, this model may lack contextual information about the body such as clothing on the body, lighting conditions, and occluded body parts.

The aforementioned problems, among others, are addressed in some embodiments by the disclosed artificially intelligent machine learning systems that generate semantically meaningful augmented images, where the augmentations maintain fidelity with body shape, pose, and environmental parameters. The disclosed technology can generate these semantically meaningful augmented images from image data, for example from a digital camera, by leveraging a system of machine learning models that confer understanding of body shape, pose, and environmental parameters depicted in the image data. While the present disclosure refers to augmenting images of humans, those skilled in the art will appreciate that the disclosed technology may be applied to generate augmented images of any type of subject, whether or not the subject is human, is animate or is inanimate.

One goal of the image augmentation system is to use the described machine-learned contextual awareness of humans in inputs to (i) generate a greater level of scene-wide contextual awareness, and (ii) use shape from images without involving humans in the loop. As a canonical example, the system considers images or video taken from a smartphone device and augments these images with either realistic or cartoon-style graphics that are realistically tied to the 3D shape, pose and motion of the human body (e.g., a flame effect that is tied to the location and/or movement of the body or a particular body part, optionally triggered by a specific motion, and which effect may be applied in a motion-aware way such as flames which would exist only in-between outstretched arms or applied to a single arm in-motion, or a cartoon rainbow coming out of a torso in a specific direction). Of course, the method applies more generally to any augmentation of input data, and may be used to generate images of users in augmented or virtual reality environments.

Artificial intelligence describes computerized systems that can perform tasks typically considered to require human intelligence. Here, the disclosed artificial intelligence systems can perform image augmentation that, without the disclosed technology, may otherwise require the skill and intelligence of a human graphical artist. The capability to learn is an important aspect of intelligence, as a system without this capability generally cannot become more intelligent from experience. Machine learning is a field of computer science that gives computers the ability to learn without being explicitly programmed, for example enabling artificial intelligence systems to learn complex tasks or adapt to changing environments. The disclosed machine learning systems can learn to determine image parameters and/or human body parameters through being exposed to large volumes of labeled training data.

As an example, the method disclosed herein enables a system to (i) recognize elements in a scene based on a contextual awareness of one or more humans in the scene and (ii) augment the two-dimensional ("2D") and 3D data in the scene. This method uses a deep learning approach and optionally outputs an augmented version of the input or a transformed output image (such as a photo output generated from a video input, a video output from a photo input, or other transformations). In one example, the system can animate someone in a scene with a photo as input and a video as the output.

As another example, the method disclosed herein includes receiving visual input including a human or person within a scene, detecting a pose associated with the human using a pre-trained statistical model associated with human poses to yield a first output, estimating a shape and a motion associated with the human using a pre-trained statistical model associated with shape and motion to yield a second output, recognizing the scene associated with the visual input using a trained convolutional neural network which determines information about the human and other objects in the scene to yield a third output and augmenting reality within the scene by leveraging one or more of the first output, the second output or the third output to place 2D and 3D graphics in the scene.

Although aspects of some embodiments described in the disclosure will focus, for the purpose of illustration, on particular examples of machine learning models, input images, and image augmentations, the examples are illustrative only and are not intended to be limiting. In some embodiments, the techniques described herein may be applied to additional or alternative image data, for example photographic images, depth images (such as laser scans, millimeter wave data, etc.), 3D data projected into a 2D plane, thermal images, 2D sensor data, video, or any combination thereof. Various aspects of the disclosure will now be described with regard to certain examples and embodiments, which are intended to illustrate but not limit the disclosure.

Overview of Example Augmented Images

Figure 1B:
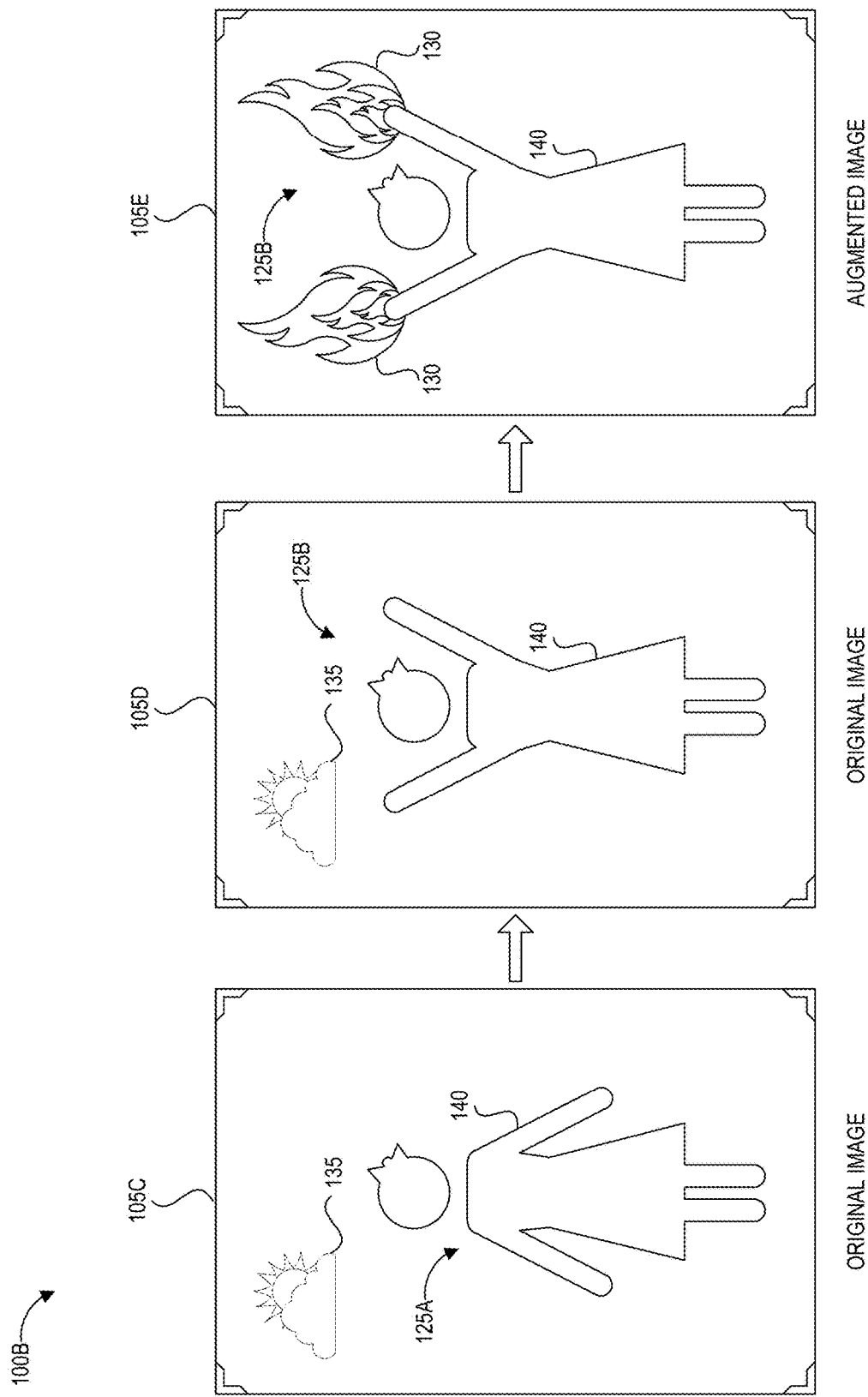

FIGS. 1A and 1B depict example original images and their corresponding augmented images that have been augmented according to the present disclosure, for example, using the process 300 described below to identify a 3D body model corresponding to the depicted human and then morphing this body model into a new pose or applying special effects over the body model.

FIG. 1A depicts two images of a human 110 performing yoga. The left image 105A is an example of an original image that may be received by the disclosed image augmentation system, and the right image 105B is an example of an augmented version of the image 105A that may be generated by the image augmentation system. The original image 105A depicts a human 110 performing yoga in an environment including a yoga mat 115. In the original image, the human 110 is in a first pose 120A that represents an attempt at a "tree" pose.

In accordance with the present disclosure, the image augmentation system can provide the image 105A to a system of machine learning models in order to analyze the image 105A. A first model can be trained to determine body pose, for example a series of poses (and their approximations) corresponding to yoga routines. This model can detect that the image 105A represents an attempt at tree pose 120A with certain technical flaws in the attempt (e.g., the arm positioning and bent leg positioning). Based on or following this detection, the image augmentation system can provide the image 105A to a second machine learning model trained to determine body shape and to a third machine learning model trained to determine environmental parameters. The second machine learning model can output data representing a 3D mapping of the human body, optionally with portions mapped to various detected articles of clothing on the body. The third machine learning model can output data representing the presence, shape, and location of the yoga mat 115.

Based on these outputs, the image augmentation system can generate the augmented image 105B depicting the human 110 with his/her tree pose form corrected in pose 120B. For example, the image augmentation system can access a model of a correct, or otherwise acceptable, tree pose and map the 3D contours of the human body (and clothing) onto the model of the correct, or otherwise acceptable, form (in effect, warping the body while maintaining realistic looking clothing and contours). In some embodiments the image augmentation system may determine which portions of the user's pose differ from the model pose by greater than a threshold value, and may augment only the corresponding portions of the image of the human 110 (e.g., pixels corresponding to the arms and bent leg). The image augmentation system can place this corrected-form representation of the human 110 into the detected environment, for example by placing it in the foreground of the yoga mat 115 and filling in any missing pixel values corresponding to the yoga mat (e.g., locations that were previously occluded by the human in the pose 120A). The color and intensity values of the filled-in pixels can be selected to match the color (or pattern of colors) and lighting gradient detected on the actual yoga mat 115.

In this example, the disclosed system operates as an artificially intelligent trainer to provide visual form feedback to the user while they perform a yoga sequence. Similar image-pose to model-pose comparison techniques can be applied in other athletic contexts (e.g., to assess and provide feedback on batting swing form, golf swing form, pitching form, dance technique, or other athletic poses or action sequences), in the physical therapy context (e.g., to provide feedback on form during physical therapy exercise), or in other context where it is desirable to provide feedback to a human on their body pose compared to a desired pose. Further, such image-pose to model-pose comparison techniques can be used in the athletic statistical context, for example to track a sequence of poses of an individual athlete or group of athletes (e.g., sequence of pitches, sequence of football plays).

FIG. 1B depicts another example implementation of the disclosed image augmentation system for visual effect/entertainment purposes. FIG. 1B depicts three images 105C, 105D, 105E of a human 140. The left and middle images 105C, 105D are examples of a sequence of original images that may be received by the disclosed image augmentation system, and the right image 105E is an example of an augmented version of the image 105D that may be generated by the image augmentation system.

Original images 105C and 105D depict the human 140 in an environment with partly cloudy lighting 135. In original image 105C, the human 140 is in a first pose 125A with her arms down. In original image 105D, the human has moved into a second pose 125B with her arms up. This may be an image augmentation trigger according to a set of image augmentation rules that specify to apply special effects of fire emitted from the hands when a human in an image raises her arms.

The image augmentation system can provide the images 105C and 105D to a system of machine learning models in order to analyze the images. As described above, a first model of the machine learning system can be trained to determine body pose, for example to detect when the human's arms are raised. This model can detect that the human 140 in the pose 125A of image 105C does not have her arms up, and then that the human 140 in the pose 125B of image 105D has her arms up. Based on this latter determination, the image augmentation system can generate an augmented image. More specifically, the image augmentation system can provide the image 105D to a second machine learning model trained to determine body shape and to a third machine learning model trained to determine environmental parameters. The second machine learning model can output data representing a 3D mapping of the human body, optionally with portions mapped to various detected articles of clothing on the body. The third machine learning model can output data representing the lighting conditions 115 and any background objects. Based on these outputs, the image augmentation system can generate the augmented image 105E depicting the human 140 with graphical depictions of fire 130 surrounding her hands. For example, the image augmentation system can retrieve pre-generated still images or animations of fire, scale the fire representation such that its base fits onto pixels identified as corresponding to the human's hands by the first machine learning model, and overlay the fire representation onto the human's hands. The overlaying can involve warping the fire representation so that it appears to surround the 3D contours of the human's hand as identified by the second model, and adjusting a color temperature of the fire to match the lighting conditions 115 determined by the third machine learning model. As such, the image augmentation system can generate a realistic visual representation of fire on the human's hands, for example to simulate superpowers.

Overview of Example Image Augmentation System

Figure 2A:
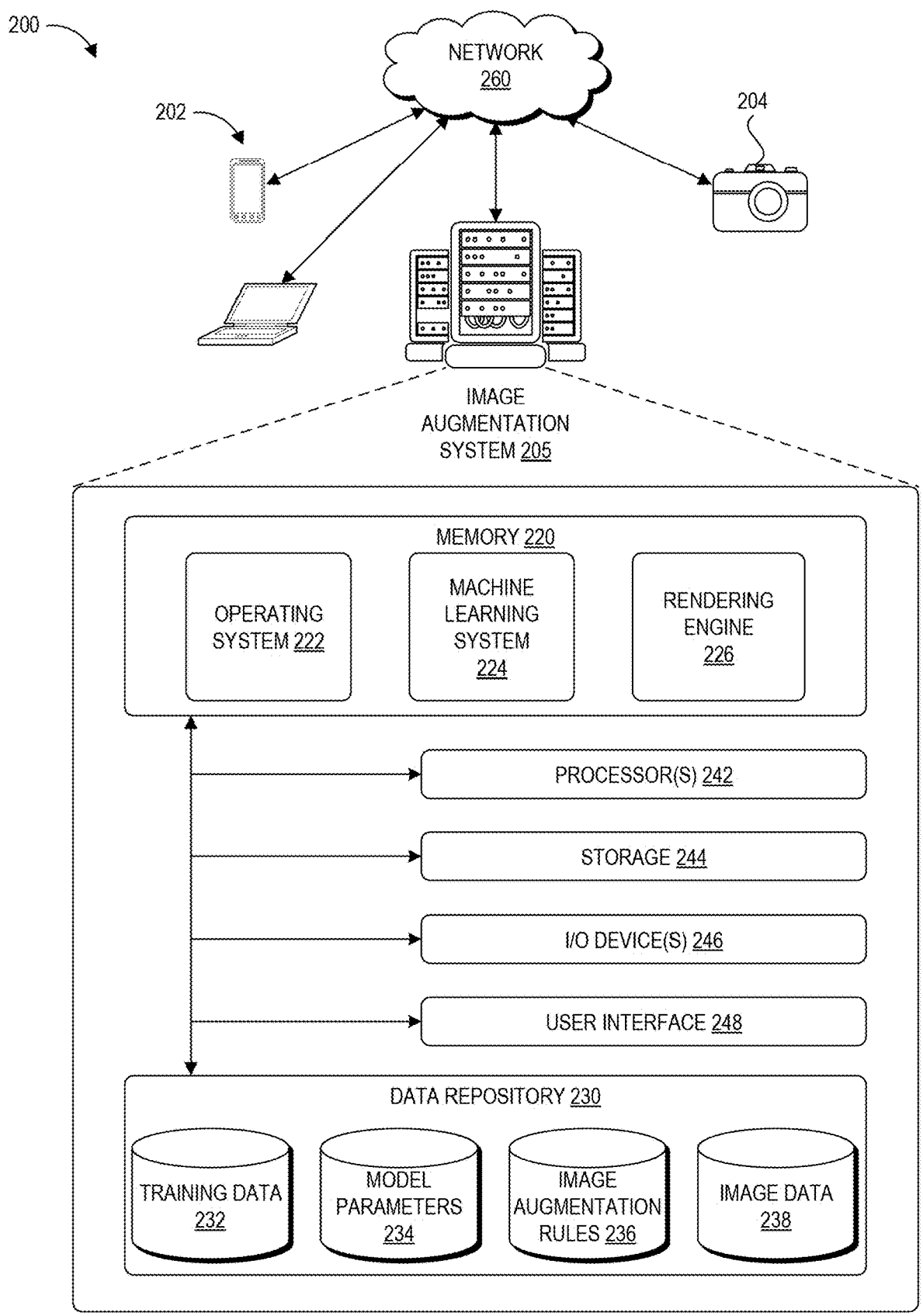
FIG. 2A is a block diagram of an illustrative image augmentation system configured to implement machine learning for augmenting images, for example the images of FIGS. 1A and 1B.

FIG. 2A is a block diagram of an illustrative computing environment 200 of an image augmentation system 205 configured to implement machine learning for augmenting images, for example the images of FIGS. 1A and 1B. As illustrated, the computing environment 200 includes the image augmentation system 205, an image acquisition device 204, and user computing devices 202 configured to communicate data with one another via network 260. Though shown separately, in some embodiments the image acquisition device 204 may be integrated into a user computing device 202, for example as a smartphone or tablet with an integrated camera.

The image augmentation system 205 includes at least one memory 220 and one or more processing units (or processor(s)) 242. The memory 220 may include more than one memory and may be distributed throughout the image augmentation system 205. The memory 220 may store program instructions that are loadable and executable on the processor(s) 242 as well as data generated during the execution of these programs. Depending on the configuration and type of memory, the memory 220 may be volatile (such as random access memory ("RAM")) and/or non-volatile (such as read-only memory ("ROM"), flash memory, or other memory). In some examples, the memory 220 may include multiple different types of memory, such as static random access memory ("SRAM"), dynamic random access memory ("DRAM"), or ROM.

The memory 220 can store the program instructions as a number of modules that configure processor(s) 242 to perform the various functions described herein, for example operating system 222 for interacting with the computing environment 200, as well as machine learning system 224 and rendering engine 226. The machine learning system 224 and rendering engine 226 can be in direct communication with one another or distributed among computing devices within a networked computing system and in communication with each other. Components used for the architecture may depend at least in part upon the type of network and/or environment selected.

The machine learning system 224 can include one or more machine learning models for performing the described image analysis tasks. For example, the machine learning system 224 can include a first model trained to identify whether a particular pose of a human is depicted in the image. This model, referred to herein as the pose detection model, can be trained based on corresponding pairs of input image data and output segmented image data with labeled pose identification. In some embodiments, the pose detection model can include a set of models each trained to identify a different one of a number of poses. In use, the model in the set that outputs highest probability can determine which pose is depicted in the image. In other embodiments, the pose detection model can include a single model trained to identify multiple poses in a set of possible poses. For example, each of a number of output nodes (e.g., for a neural network) can be mapped to a different pose. In use, the output node of the model that outputs highest probability can determine which pose is depicted in the image.

The pose detection model can additionally be trained to determine additional information about the input image to increase the fidelity of the determined body information in the input image. The pose detection model can utilize methods including fine-grained body-aware image analysis such as per-pixel image segmentation, depth estimation, lighting estimation and color/texture extraction to understand lighting conditions, details about the body and any clothing, occlusion (body parts and objects that are hidden by other objects), and to detect planes (surfaces, ceilings, walls, floors, etc.). The pose detection model can leverage the known pose and shape of the body in the input to facilitate estimation of other elements in the input that relate to the pose, including, but not limited to shape, color, and texture.

The machine learning system 224 can include a second model, referred to herein as the shape detection model. The shape detection model is trained to identify, from the input image data, the shape of the human body depicted in the image data. In some embodiments, the shape detection model can be provided with an input of segmented image data from the first model, where the segmented image data isolates pixels corresponding to the human body in its pose. The shape detection model can be trained based on corresponding pairs of input image data (for example, entire images or segmented image data) and output 3D mappings of body surfaces. In some embodiments, the shape detection model can be pose-specific. For example, once a particular pose is identified using the pose detection model, the image data can be provided to a shape detection model corresponding to that pose from among a set of potential shape detection models each corresponding to a different pose. In other embodiments, the shape detection model can be agnostic as to a particular pose, and can be trained to identify 3D body contours across a range of poses in its training data set.

The system can also implement pose detection, and shape and motion estimation by leveraging the second machine learning model as a model of human pose, shape and motion. The shape detection model in this context can be one or more statistical models trained using, for example, Motion and Shape Capture ("MOSH") technology or Skinned Multi-Person Line ("SMPL") technology. While marker based motion capture uses a skeleton that acts as a proxy for human movement, MOSH replaces the skeleton with a parametric 3D body model. Given a standard marker set, MOSH simultaneously estimates the marker locations on a proxy 3D body model, estimates the body shape, and recovers the articulated body pose. By allowing body shape to vary over time, MOSH is able to capture the non-rigid motion of soft tissue. Pose and shape may be jointly estimated, or independently estimated from one or more inputs. The shape detection model may be parametric such that the body shape is captured by a small number of parameters. It may also be a convolutional neural network, as described more below, or another suitable mathematical model trained from realistic real-world or synthetic data. This allows the system to locate the body in the input and provides high level understanding of the 3D shape, pose and motion of each body in the input.

By body shape, the present disclosure means one or both of subjective/qualitative and metrically accurate information about the body that can be used to size clothing, create avatars, measure health risks, etc. This may be in the form of a 3D "model" of the body, which can be represented by a mesh, point cloud, voxel grid, or other graphics representation. This model may be parametric such that the body shape is captured by a small number of parameters. Shape, however, can also mean things like standard tailoring measurements on the body, body type, or information related to clothing size. All of the above are referred to as "shape." A machine learning model as described herein can detect one or more of these shapes depending upon the shapes labeled in its training data.

The machine learning system 224 can include a third machine learning model trained to identify other semantic content of the image scene. This other semantic content can include lighting conditions and/or the location and size of objects in the foreground or background of the image. This model is referred to herein as the scene analysis model. The scene analysis model can include a set of models each trained to identify a particular object. The scene analysis model can include one or more models trained to identify lighting conditions, color cast, and other parameters of the ambient scene conditions. Thus, the scene analysis model can recognize other objects in the scene, including geometry, color, and lighting.

The first, second, and third machine learning models described herein can comprise artificial neural networks. Artificial neural networks are artificial in the sense that they are computational entities, inspired by biological neural networks but modified for implementation by computing devices. Artificial neural networks are used to model complex relationships between inputs and outputs or to find patterns in data, where the dependency between the inputs and the outputs cannot be easily ascertained. A neural network typically includes an input layer, one or more intermediate ("hidden") layers, and an output layer, with each layer including a number of nodes. A neural network is considered "deep" when it includes two or more hidden layers. The nodes in each layer connect to some or all nodes in the subsequent layer and the weights of these connections are typically learned from data during the training process, for example through backpropagation in which the network parameters are tuned to produce expected outputs given corresponding inputs in labeled training data. Thus, an artificial neural network is an adaptive system that is configured to change its structure (e.g., the connection configuration and/or weights) based on information that flows through the network during training, and the weights of the hidden layers can be considered as an encoding of meaningful patterns in the data.

Specifically, the first, second, and third machine learning models described herein can comprise convolutional neural networks ("CNNs"). A CNN is a type of artificial neural network, and like the artificial neural network described above, a CNN is made up of nodes and has learnable weights. However, the layers of a CNN can have nodes arranged in three dimensions: width, height, and depth, corresponding to the 2×2 array of pixel values in each video frame (e.g., the width and height) and to the number of video frames in the sequence (e.g., the depth). The nodes of a layer may only be locally connected to a small region of the width and height layer before it, called a receptive field. The hidden layer weights can take the form of a convolutional filter applied to the receptive field. In some embodiments, the convolutional filters can be two-dimensional, and thus, convolutions with the same filter can be repeated for each frame (or convolved transformation of an image) in the input volume or for designated subset of the frames. In other embodiments, the convolutional filters can be three-dimensional and thus extend through the full depth of nodes of the input volume. The nodes in each convolutional layer of a CNN can share weights such that the convolutional filter of a given layer is replicated across the entire width and height of the input volume (e.g., across an entire frame), reducing the overall number of trainable weights and increasing applicability of the CNN to data sets outside of the training data. Values of a layer may be pooled to reduce the number of computations in a subsequent layer (e.g., values representing certain pixels may be passed forward while others are discarded), and further along the depth of the CNN pool masks may reintroduce any discarded values to return the number of data points to the previous size. A number of layers, optionally with some being fully connected, can be stacked to form the CNN architecture.

During training, a CNN used for the pose detection model learns, for example, what pixel values in input image data correspond to particular human body poses (e.g., specific arrangements of limbs and torso) and encodes this information in the values of its convolutional filters such that it can provide an automated evaluation of pose shown in new input images. This may be accomplished in some embodiments by providing pixel values of an input image to the input nodes of a CNN and providing a labeled output image to the output nodes, with the labels indicating which pixels depict a human and which pixels depict non-human scenery. The labeled output can thus represent a segmented image, and the same CNN or another machine learning model can learn a particular pose associated with that segmented image. In other embodiments, the output nodes of the CNN can each correspond to a different pose in a multi-pose dataset, and training can include providing the pixel values of the input image to the input nodes of a CNN and indicating which output node corresponds to the depicted pose. The CNN can thus learn which pixel value patterns are associated with which poses.

A CNN used for the shape detection model learns, for example, what pixel values in input image data correspond to a particular body model or other 3D representation of the human body contours, and encodes this information in the values of its convolutional filters such that it can provide an automated evaluation of body shape shown in new input images. For example, the output nodes of the CNN can each correspond to a different body model in a multi-shape dataset, and training can include providing the pixel values of the input image to the input nodes of a CNN and indicating which output node corresponds to the body model of the depicted human. The CNN can thus learn which pixel value patterns are associated with which body models.

A CNN used for the scene analysis model learns for example what pixel values in the image data correspond to particular objects or generally to foreground/background objects, lighting conditions, or other parameters of the foreground and/or background environment of the image and encodes this information in the values of its convolutional filters such that it can provide an automated evaluation of new environments depicted in new input images.

The semantic feature representations learned by the pose detection model, shape detection model, and scene analysis model enable the rendering engine to manipulate the input image in a semantically meaningful manner that maintains fidelity to the originally-depicted objects and scenery while also adding augmented graphics. The rendering engine 226 can use the output from one, two, or all of the first, second, and third machine learning models in order to augment the original image. The rendering engine 226 can also use specified image augmentation rules 236 to determine whether and how to augment the original image.

In one example, the rendering engine 226 can, based on the metadata or content related to human shape, pose, and motion (and maybe interactions determined between humans based on their respective poses), transform or augment the input image in a way to generate an output that contextually resembles the input image but with augmented features. The transformation can include visuals, sound, etc. For example, the machine learning system 224 can detect a human's motion of throwing his/her hands up in the air and the rendering engine 226 can provide corresponding visuals and sounds for the "virtual crowd goes wild." As another example, the machine learning system 224 can determine the 3D model of a human's body and then the rendering engine 226 can animate a virtual finger poke complete soft tissue deformation based on the 3D model of the human's body. As another example, when the machine learning system 224 determines that a human user's motion matches a prescribed series of dance moves, the human user can get points in a video game. In another video game example, or in a social media photo filtering context, the human's movements can unlock effects. For example, when a human in an image is jumping up and down the machine learning system 224 can detect contact with the ground and/or a specific pose and/or multiple people collectively forming a pose, all could trigger a filter. The rendering engine 226 can also output particular information based on a comparison of multiple people in the input data (e.g., who is tallest). The disclosed techniques can also be used for tracking bodies over time and displaying data about changes in shape. In some examples, the machine learning system 224 can identify pose and/or shape of a depicted human in a sports image and translate this information into the most likely sport that the human is playing. An action or movement refers to poses over time that are semantically meaningful.

As further examples, the machine learning system 224 can use the body as a tool to recognize objects in the scene (e.g., if it can tell a human is holding a cup, the rendering engine 226 can apply a filter to the cup, like making flames come out of a mug if the imaged human raises the mug above his shoulder). The machine learning system 224 can tell where a human's face is vis-à-vis her body. As such, even on an incredibly low quality input, the machine learning system 224 can use the detected body pose to estimate where the face is, and can run that region of the image run through a facial-detection machine learning model trained to recognize the facial features of different particular individuals. As further examples, the rendering engine 226 can transform a human into a mermaid (e.g., by applying a mermaid tail to the detected region of the human's legs and by removing the legs from the photo and augmenting the background in the removed leg region), or implement a funhouse mirror (e.g., by morphing the body according to a model of funhouse mirror optics). The rendering engine 226 can also pull the human out of the photo and change the background to compensate for the removed human, for example by filling in the pixels in the region of the removed human with estimates of the background content in those locations. The rendering engine 226 can change people into avatar-like images, for example 33% toward a cartoon character version of the imaged human.

As another example, the processing of the system can be based on group body language as indicated by the collective poses of two or more humans. For example, the machine learning system 224 can predict what one or more of the humans are thinking based on their determined poses and then the rendering engine 226 can augment the scene, for instance with a speech bubble and the predicted thoughts. The rendering engine 226 can also place the human in the determined pose in a new scene, for example by placing them in a new background, and may add 2D or 3D static or animated graphics in contextually-appropriate locations with respect to the body model or certain parts of the body model. The machine learning system 224 can detect interactions between people (e.g., looking at each other, giving high fives) or self-interactions (e.g., clapping) and this may trigger specific augmentations. The system can also use the human body as a building block to do recognition of other aspects of the scene, for example using the body as a geometric primitive. The system can do some of these things without having the whole body in-frame. The system can also be implemented as a photo booth or display advertising, etc., where it detects a body and applies a filter. For example, the system could identify a whole family within an individual input image and turn them into superpower characters, each with his/her own graphically augmented superpower.

As described above with respect to FIG. 1A, the machine learning system 224 can also detect a human's pose and compare this to a "correct" pose like the correct yoga pose, batting swing, etc. This information can be leveraged by the rendering engine 226 to morph the human's body from a determined incorrect form or pose into the correct pose, for example, to provide instructional training. By leveraging the outputs of pose detection, shape and motion estimation and other information extracted from the scene, the rendering engine 226 can place 2D and/or 3D graphics in the scene such that they interact with the humans and objects in the image in a semantically meaningful fashion. The rendering engine 226 can additionally or alternatively transform the humans and objects using these outputs.

To accomplish body morphing, the rendering engine 226 can use one or more of a 3D mesh of the human body, a texture map, and a displacement map (depicted in FIGS. 4A-4D, described below) to realistically transform the human's pose. Some embodiments of the rendering engine 226 can implement a SMPL model. A SMPL model is a skinned vertex-based model that accurately represents a wide variety of body shapes in natural human poses. The parameters of the model are learned from data including the rest pose template, blend weights, pose-dependent blend shapes, identity-dependent blend shapes, and a regressor from vertices to joint locations. Blend shapes define deformations (as vertex displacements) relative to a base shape, where these deformations are a function of an articulated pose. Different blend shapes for identity, pose, and soft-tissue dynamics are additively combined with a rest pose template body model before being transformed by blend skinning. Blend skinning defines how the body surfaces change as a function of poses of the underlying skeleton, where the skeleton acts as a deformer that transfers its motion in a weighted manner to vertices representing the body surface. For example, each joint of the skeleton can be assigned a weight with respect to each vertex on the body surface model, and each vertex may be affected by one or more joints according to these weights. The pose-dependent blend shapes are a linear function of the elements of the pose rotation matrices. This formulation enables the SMPL model to account for body shape changes that occur as the human body deforms naturally with pose, and to exhibit soft tissue motions like those of real humans. The SMPL model is also efficient to animate and compatible with most existing rendering engines.

For example, the rendering engine 226 can access a SMPL multi-shape dataset that includes a number of triangulated meshes of different human body shapes and weights ("body models"), and an appropriately-trained SMPL multi-pose dataset including the poses required for a particular application (e.g., yoga poses, batting swing poses). The body models may include a default or rest pose. The poses of the multi-pose dataset can include the rest pose, and can also include pre-generated transformations of the body models into the poses or blend shapes that transform the body models into the poses. The output of the shape detection model may identify one of those body models that is predicted to correspond to the depicted human. The rendering engine 226 can then use this body model in order to transform the pose of the human, for example, using the SMPL multi-pose dataset to generate body deformation on the body models that transforms it into the desired pose. This can include applying a pose-dependent blend shape to vertices of the template shape (the mesh corresponding to the identified body shape), based on the desired or correct pose of the body model, and applying a blend skinning procedure (also known as skeleton-subspace deformation) to the result. The blend skinning procedure can be applied based on locations of joints of a skeletal rig defining the pose of the body model. The output of the shape detection model can also include a texture mapping of the skin, hair, and clothing textures depicted in the input image. This texture map can be applied to the mesh in order to preserve the appearance of the imaged human in the new pose.

In some embodiments, the rendering engine 226 can apply pre-generated graphics in a manner that comports with the semantic image information determined by the machine learning system 224. For example, as described with respect to FIG. 1B, the rendering engine 226 can use pre-generated graphics of fire, and can scale, warp, and position these graphics to match the determined size, contours, and location of the depicted human hands. In some embodiments, the rendering engine 226 can apply a different style to the input image by passing it through a CNN with internal parameters that model the different style, and then using the values of output nodes of the CNN to generate new pixel values.

In some embodiments, the rendering engine 226 can morph part or all of the detected human body by aligning the detected pose with a model pose, as described above with respect to FIG. 1A. The model pose refers to the ideal or correct body posture for a given pose, e.g., the correct arm, torso, and leg placement for the tree pose as shown in FIG. 1A. In one implementation, both the detected pose and the model pose can be modeled as a connected system of segments passing through different body part components, for example, corresponding to the skeletal system. The imaged body can be morphed into the correct pose by scaling the model pose to match the size of the detected pose or the size of the detected human body, aligning the segments of the detected pose with the segments of the model pose, and moving the pixels depicting the body correspondingly. To illustrate, in FIG. 1A the human's arms have been morphed, and the pixels corresponding to the arms have maintained substantially the same shape as the human's natural arm shape. This morphing can additionally involve using the 3D model output from the shape detection model to move the body-depicting pixels into the new pose while maintaining a realistic depiction of the human body. Such body morphing embodiments can also involve maintaining the position of any foreground objects in front of the human and/or any background objects behind the human based on information from the scene analysis model. For example, the rendering engine 226 can fill in estimated pixel values of portions of background objects that were occluded by the detected pose but are visible behind the corrected pose. In doing so, the rendering engine 226 can maintain fidelity to the semantic content of the original image while morphing the human.

Referring again to FIG. 2A, the processor 242 may include one or more general purpose computers, dedicated microprocessors, graphics processors, or other processing devices capable of communicating electronic information. Examples of the processor 242 include one or more application-specific integrated circuits ("ASICs") (e.g., processors designed specifically for machine learning training and/or inference), graphical processing units ("GPUs"), field programmable gate arrays ("FPGAs"), graphics processing units ("GPUs"), digital signal processors ("DSPs") and any other suitable specific or general purpose processors. The processor 242 may be implemented as appropriate in hardware, firmware, or combinations thereof with computer-executable instructions and/or software. Computer-executable instructions and software may include computer-executable or machine-executable instructions written in any suitable programming language to perform the various functions described.

In some examples, the image augmentation system 205 may also include additional storage 244, which may include removable storage and/or non-removable storage. The additional storage 244 may include, but is not limited to, magnetic storage, optical disks, and/or solid-state storage. The disk drives and their associated computer-readable media may provide non-volatile storage of computer-readable instructions, data structures, program modules, and other data for the computing devices. The memory 220 and the additional storage 244, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, and components, may refer to programming modules executed by computing systems (e.g., processors) that are part of the architecture.

The image augmentation system 205 may also include input/output ("I/O") device(s) and/or ports 246, such as for enabling connection with a keyboard, a mouse, a pen, a voice input device, a touch input device, a display, speakers, a printer, or other I/O device. The image augmentation system 205 may also include a user interface 248. The user interface 248 may be utilized by a user to access portions of the computing environment 200. In some examples, the user interface 248 may include a graphical user interface, web-based applications, programmatic interfaces such as application programming interfaces ("APIs"), or other user interface configurations. The user interface 248 can include displays of the feedback provision user interfaces described herein. In some embodiments, the I/O device(s) and/or ports 246 and user interface 248 can be part of a user computing device accessing the image augmentation system 205 via network 260.

The image augmentation system 205 may also include a data store 230. In some examples, the data store 230 includes one or more data stores, databases, data structures, or the like for storing and/or retaining information associated with the computing system 200. Thus, the data store 230 may include data structures, such as the training data repository 232, model parameters data repository 234, image augmentation rules 236, and image data 238. Data repositories can include a single database or multiple distinct databases, and may be stored using a single electronic storage device or multiple distinct electronic storage devices.

As described above, the machine learning system 224 may include a number of machine learning models that perform different tasks for recognizing humans, other objects and/or their shape in input image data. The machine learning system 224 can also include instructions for training these models in order to learn the parameters that enable the models to identify the desired features represented by input data. The training data repository 232 stores training data that can be used to learn these parameters, for example labeled pairs of input data and the corresponding or expected output. For example, for the pose detection model can be trained using pairs of input images and their corresponding segmented images (e.g., identifying the pixels corresponding to the human) and indications of which pose is depicted. The shape detection model can be trained using pairs of input images and the corresponding 3D contours of the depicted body. The input images may be segmented to identify the pixels that correspond to the body, and the expected output can be a depth map, 3D mesh, or other 3D representation of the body contours. The scene analysis model can be trained using labeled depictions of various foreground and/or background objects, lighting conditions. The training data repository 232 can store these types of data for training the models.

Deep learning is accomplished in part by training one or more convolutional neural networks (each, a "CNN"). The CNNs are trained using examples consisting of pairs of sensor data (for example, photos or video, some of which may be pre-processed with methods such as cropping) and corresponding body shape, pose and motion information (which may be determined by methods including hand measurements, clothing sizing information, human labeling of the sensor data or deriving shape, pose and motion information from other sensor data (e.g., 3D sensors, motion capture equipment, additional camera hardware, etc.)).

Once the CNN(s) have been trained, new inputs of the same form as the training sensor data can be presented to the CNNs. The CNNs predict the corresponding body shape, including ratings, 3D body shape, measurements, volumes, clothing sizes, and other shape metrics. The CNN's ability to predict body pose is also possible based on its training data.

The model parameters data repository 234 stores the parameters of machine learning models, including CNNs, trained as described herein. For example, the model parameters data repository 234 can store the finalized parameters of the pose detection model, shape detection model, and scene analysis model.

The image augmentation rules data repository 236 stores rules for augmenting image data. These rules may be set by a user of the image augmentation system 205 and then applied to input image data. For example, the image augmentation rules data repository 236 can include rules that specify when to morph a detected pose into a model pose (e.g., based on the output probability of the image depicting that pose being within a certain threshold range, or based on a certain level of difference between the detected pose and the model pose). As another example, the image augmentation rules data repository 236 can include rules that specify certain detected poses that trigger particular animations or augmented graphics to be applied to the input images.

The image data repository 238 may store data representing input images, augmented images, and any pre-rendered graphics used to generate the augmented images. The image data repository 238 can also store data representing segmented images output by the pose detection model, 3D body models output by the shape detection model, and any information output by the scene analysis model.

The image augmentation system 205 can communicate over network 260 with the image capture device 204 and user devices 202. In some embodiments, the image augmentation system 205 can be included in the image capture device 204 and/or user devices 202. The network 260 can include any appropriate network, including an intranet, the Internet, a cellular network, a local area network or any other such network or combination thereof. For example, network 260 may be a publicly accessible network of linked networks, possibly operated by various distinct parties, such as the Internet. In other embodiments, the network 260 may include a private network, personal area network, local area network, wide area network, cable network, satellite network, cellular telephone network, etc., or a combination thereof, some or all of which may or may not have access to and/or from the Internet.

Image capture device 204 includes optical components (e.g., one or more lenses, color filters) and an image sensor configured to capture image data. The image sensor can be a charge-coupled device ("CCD"), complementary metal oxide semiconductor sensor ("CMOS"), or any other image sensing device that receives light and generates image data in response to the received image. A sensor can have an array of photosensitive elements that produce raw values for image pixels. The image capture device 204 can also include an image signal processor configured to perform various processing operations on received raw image data to output a processed image. Examples of image processing operations include cropping, scaling (e.g., to a different resolution), image format conversion, image filtering (e.g., spatial image filtering), lens artifact or defect correction, demosaicing, etc. The image capture device 204 can also include a memory storing instructions for capturing and processing images and for storing any generated image data.

User devices 202 can include any network-equipped computing device, for example, desktop computers, laptops, smartphones, tablets, e-readers, gaming consoles, wearable devices, and the like. Users can access the image augmentation system 205 to send image data to and receive image data from the image augmentation system 205 via the network 260. The user devices 202 can be provided with augmented images via the network 260. In some embodiments, the components of the image augmentation system 205 may be incorporated into the user devices 202. In some embodiments, the components of the image capture device 204 and the image augmentation system 205 may be incorporated into the user devices 202.

Figure 2B:
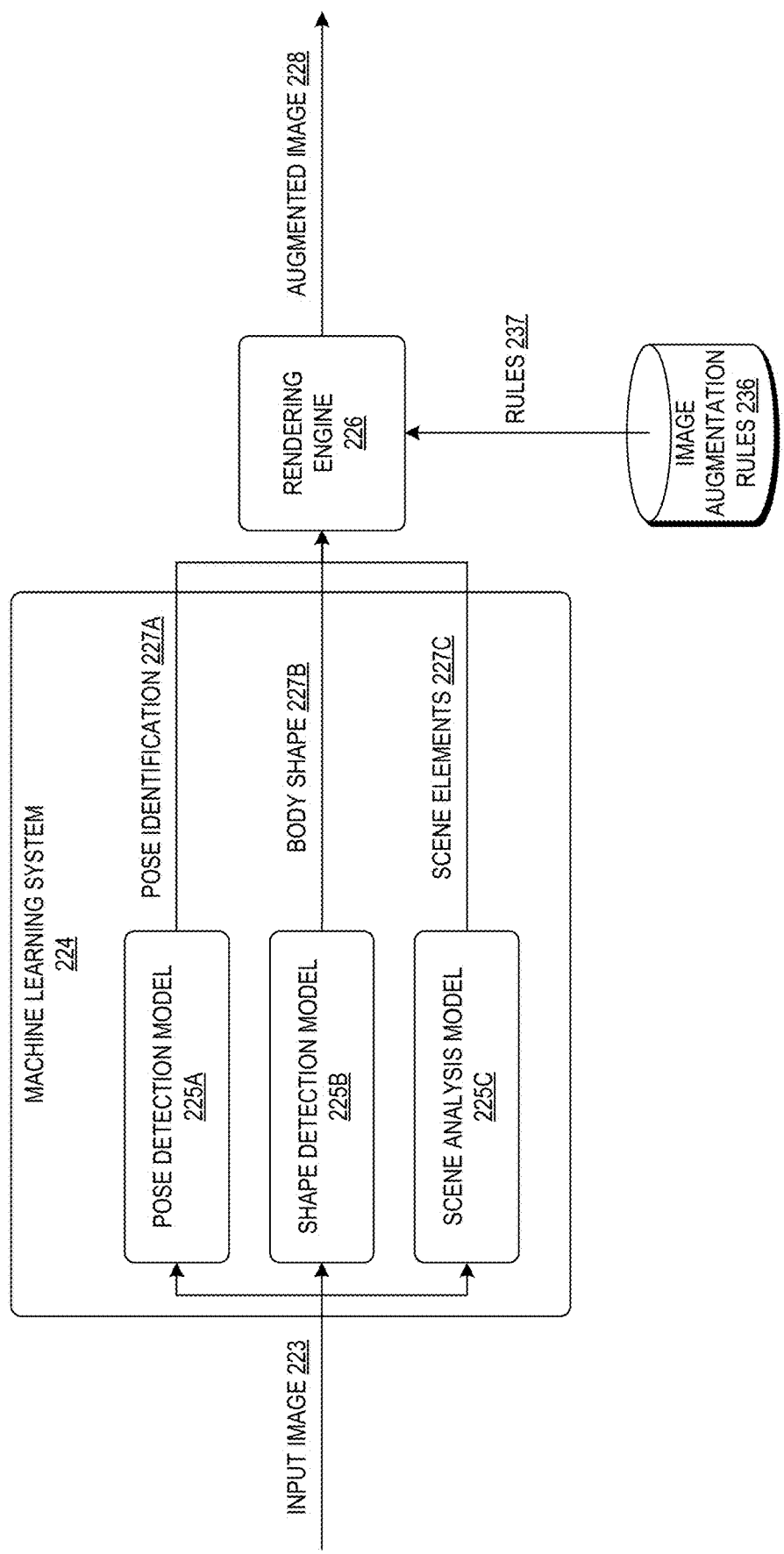
FIG. 2B is a block diagram showing example data flow between components of the image augmentation system of FIG. 2A.

FIG. 2B is a block diagram showing example data flow between components of the image augmentation system 205 of FIG. 2A. As illustrated in FIG. 2B, input image data 223 flows into the machine learning system 224 where it is processed by the pose detection model 225A, shape detection model 225B, and scene analysis model 225C as described above.

The pose detection model 225A outputs a pose identification 227A that identifies the pose of the human(s) depicted in the input image data 223. The pose identification 227A can also include representations of spatial relationships of the body parts that make up that pose. As described herein, this may be a particular pose expected within a particular context, such as for a sport or particular action in a sport. The shape detection model 225B outputs a body shape 227B which is a representation of the 3D contours of the human body depicted in the input image data 223. The scene analysis model 225C identifies other semantic content of the scene, and outputs scene elements 227C that can include foreground/background objects in the image and other scene parameters such as lighting conditions.

The rendering engine 226 takes the pose identification 227A, body shape 227B, and scene elements 227C as inputs together with rules 237 from the image augmentation rules data repository 236. In one example, the rules 237 can specify a model pose representing a model of correct body form/posture for the identified pose, and can specify how the image representation of the human body is to be morphed based on comparison of the pose of the pose identification 227A with the model pose. Based on these inputs, the rendering engine 226 outputs the augmented image 228.

Overview of Image Augmentation Process

Figure 3:
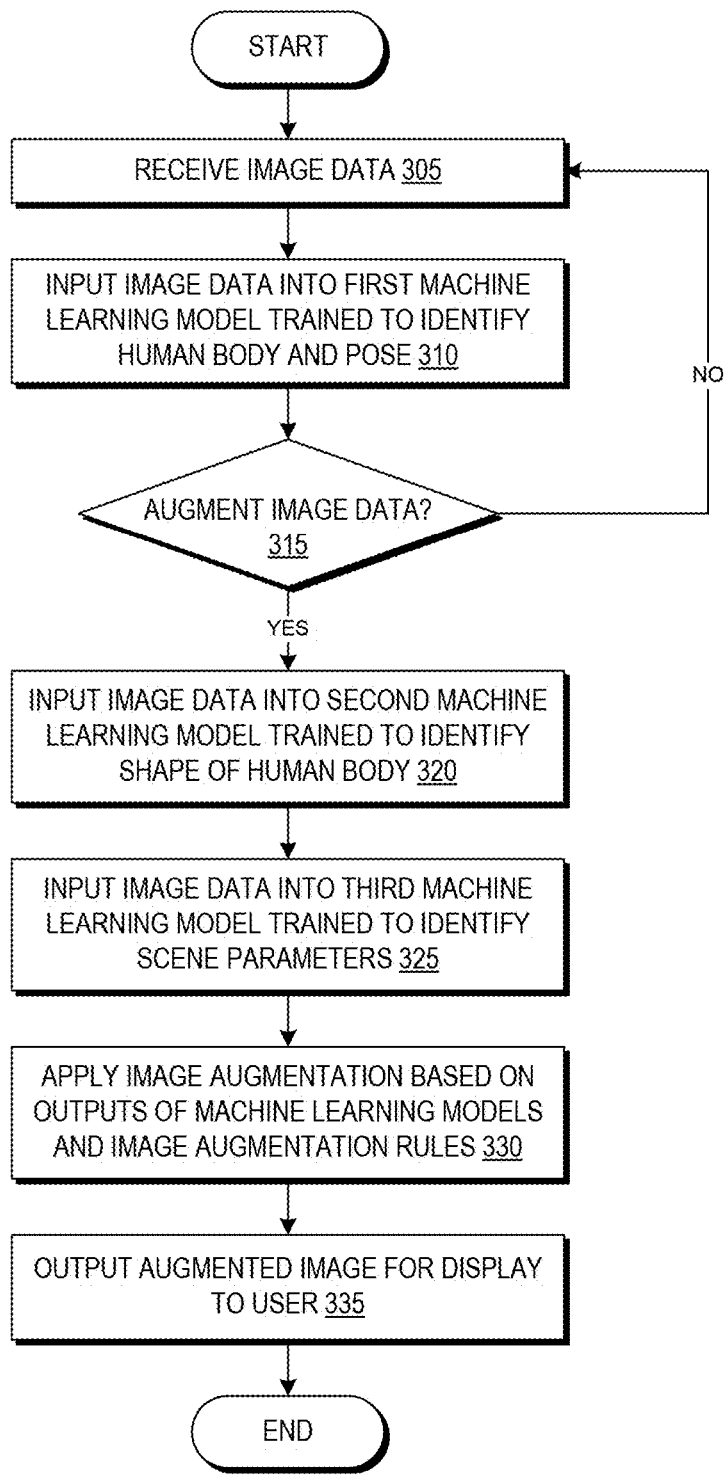
FIG. 3 is a flow diagram of an illustrative machine learning process for generating augmented images using the system of FIG. 2A.

FIG. 3 is a flow diagram of an illustrative machine learning process 300 for generating augmented images using the computing environment 200 of FIG. 2A or another suitable computing system.

The process 300 may begin in response to an event, such as on a predetermined or dynamically determined schedule, on demand when initiated by a user, or in response to some other event. When the process 300 is initiated, a set of executable program instructions stored on one or more non-transitory computer-readable media (e.g., hard drive, flash memory, removable media, etc.) may be loaded into memory (e.g., random access memory or "RAM") of a server or other computing device of the computing environment 200. The executable instructions may then be executed by a hardware-based computer processor (e.g., a central processing unit or "CPU") of the computing device. In some embodiments, the process 300 or portions thereof may be implemented on multiple computing devices and/or multiple processors, serially or in parallel.

At block 305, the image augmentation system 205 receives an input image depicting a human in a certain pose. The input image may also depict various foreground and background objects.

At block 310, the image augmentation system 205 inputs the image data into a first machine learning model, for instance pose identification model 225A, that is trained to identify pixels corresponding to the human body and a pose depicted by those pixels. For example, the pose identification model 225A can be trained to identify a set of yoga poses, body poses during a batting swing or golf swing, physical therapy poses, or other sets of poses. In other examples the pose identification model 225A can be trained to identify poses that are pre-defined for triggering certain image augmentation outputs, such as the arm-raising example of FIG. 1B.

At block 315, the image augmentation system 205 determines whether to augment the image data based on the determined pose. For example, this can be based on a comparison of the determined pose to a model pose. If the determined pose differs from the model pose by greater than a pre-defined amount (e.g., the determined pose substantially differs from the model pose), the decision at block 315 can be "yes." The pre-defined amount can relate to the positioning of one or more body parts of the human differing from the positioning of a corresponding one or more body parts of the model pose by greater than a threshold value, for example an angular position value specifying an angle between that body part and a connected body part, or value representing the length and/or positioning of a joint-to-joint segment. In some implementations, the pose can be defined using a 2D array of joint vertices identified in the image data, and the pose-to-model-pose comparison can involve comparison of these joint locations and/or of segments connecting these joints. If the pose does not differ from the model pose by greater than the pre-defined amount, the decision at block 315 can be "no." As another example, block 315 can include looking up the detected pose in the image augmentation rules 236 to determine if there is an augmentation associated with that particular pose.

If the decision at block 315 is "no," the process 300 loops back to block 305 to await new input image data. If the decision at block 315 is "yes," the process 300 transitions to block 320 and the image augmentation system 205 inputs the image data into a second machine learning model, for example, shape identification model 225B, trained to identify the shape of the human body. For example, the shape identification model 225B can generate a 3D representation such as a point cloud, mesh, voxel grid, or depth map representing the contours of the human body. This may be, in some examples, one body model of many body models in a SMPL multi-shape data set. The shape detection model 225B can also generate a texture map representing the skin, hair, and clothing of the human and/or a displacement map representing the actual contours of the human body surfaces. As described in more detail with respect to block 330 below, the rendering engine can apply blend weights to vertices of this body model to morph it into the desired pose, and can apply the texture map and/or displacement map to the morphed body model in order to recreate the particular appearance of the depicted human in the new pose.

At block 325, the image augmentation system 205 inputs the image data into a third machine learning model, for example, scene analysis model 225C, trained to other semantic content of the image scene. The scene analysis model 225C can identify foreground and background objects and possibly other scene elements such as lighting conditions.

At block 330, the rendering engine 226 of the image augmentation system 205 applies image augmentation based on the outputs of machine learning models and on image augmentation rules. For example, the image augmentation rules can specify a model pose representing a model of correct body form/posture for the identified pose. The rules can also specify how the identified pose should be compared to the model pose, and further how the image representation of the human body is to be morphed based on comparison of the identified pose with the model pose. The image augmentation can include morphing the depicted human body into the correct pose by moving the determined 3D representation into alignment with the correct pose. This can be accomplished by applying blend weights to the vertices of the body model identified at block 320 in order to morph it into the correct pose. For example, an underlying skeletal structure of the body model in a rest pose can be aligned into the new pose. Blend skinning can be applied to move the "skin vertices"—the vertices of the model of the exterior surfaces of the body—according to the movement of the underlying skeletal structure to which it was attached in the rest pose. The rendering engine 226 can then apply the texture map and/or displacement map generated at block 320 to the morphed body model in order to recreate the particular appearance of the depicted human in the new pose. The image augmentation can further maintain fidelity to the original semantic content of the image by maintaining the approximate position of the human within the scene, and by maintaining the position of any foreground objects in front of the human and/or any background objects behind the human based on the information from the scene analysis model 225C. Thus, the rendering engine 226 can morph the depiction of the human body into the correct pose while maintaining the other semantic content of the image.

At block 335, the image augmentation system 205 outputs the augmented image for display to the user. This can serve to provide visual form correction feedback to the user, which can beneficially assist the user in athletic training, physical therapy, or other endeavors that involve precision with body posture.

Body Model Examples

FIGS. 4A-4D depict examples of body shape related data that can be output by a shape detection model as described herein.

Figure 4A:
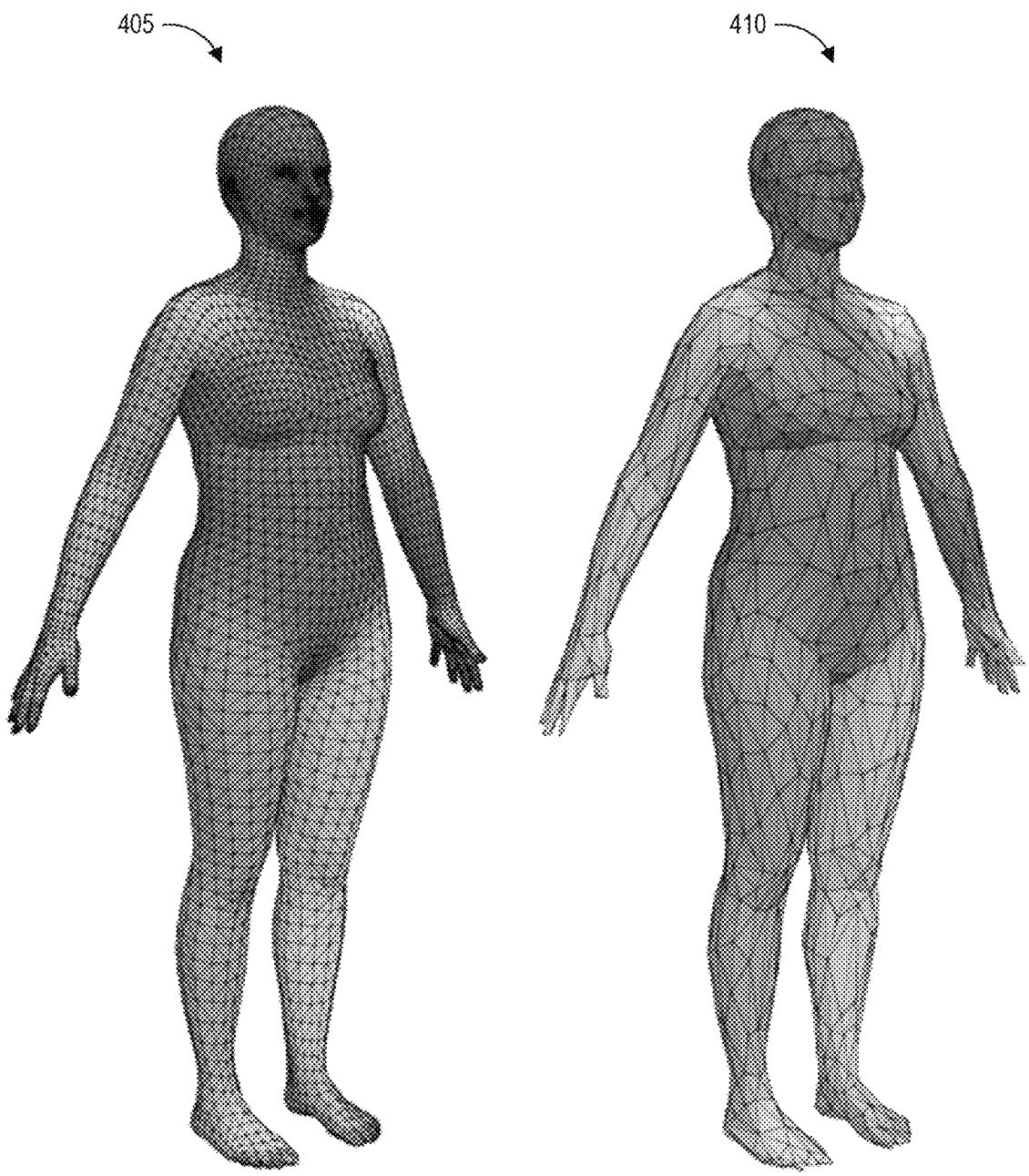
FIGS. 4A-4D depict examples of body shape related data that can be output by a shape detection model as described herein.

FIG. 4A depicts two examples of three-dimensional representations of a typical female shape. The first representation 405 is at a resolution of 6890 vertices and the second representation 410 is at a resolution of 863 vertices. The various shades of grayscale illustrate the segmentation of the body into parts and the blend weights. These examples are provided to illustrate and not intended to limit the disclosed three-dimensional body representation to a particular number of vertices.

Figure 4B:
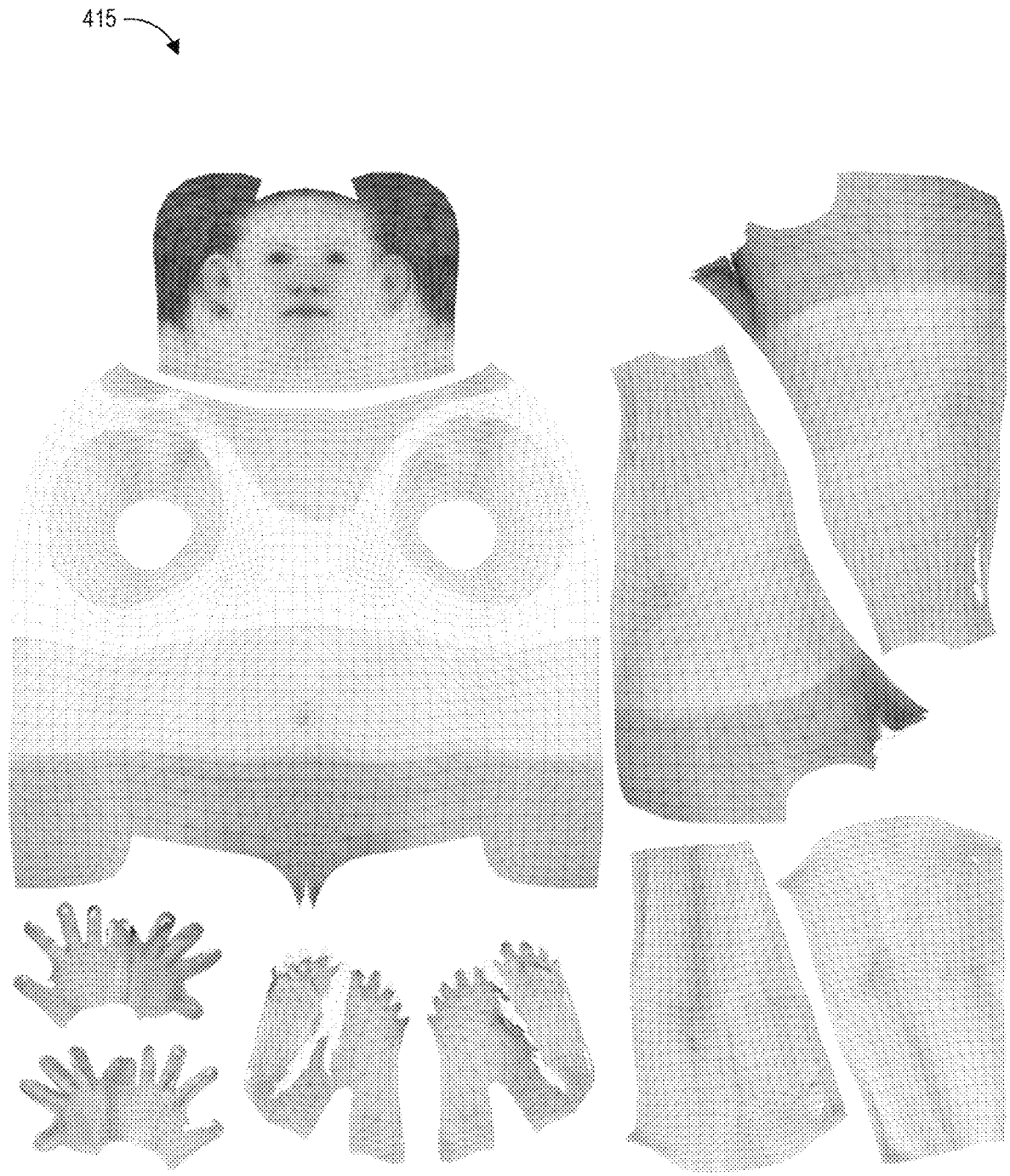

FIG. 4B depicts a high resolution texture map 415 of the exterior texture of a human female that can be modeled using the shape of FIG. 4A. As illustrated, the texture map represents details of the clothing, skin, and hair of the human. The texture map has been "unwrapped" such that the entire 3D surface of the human is shown in a 2D representation.

Figure 4C:

FIG. 4C depicts a high resolution displacement map 420. Displacement maps include grayscale values and displace (e.g., change the contours of) a 3D mesh to which they are applied. Here, the displacement map 420 is a representation of the actual contours of the human depicted by the texture map 415. The black areas are the lowest points and the white areas are the high points of the contours of the human, with the shades of grey representing points in between the highest and lowest points.

Figure 4D:
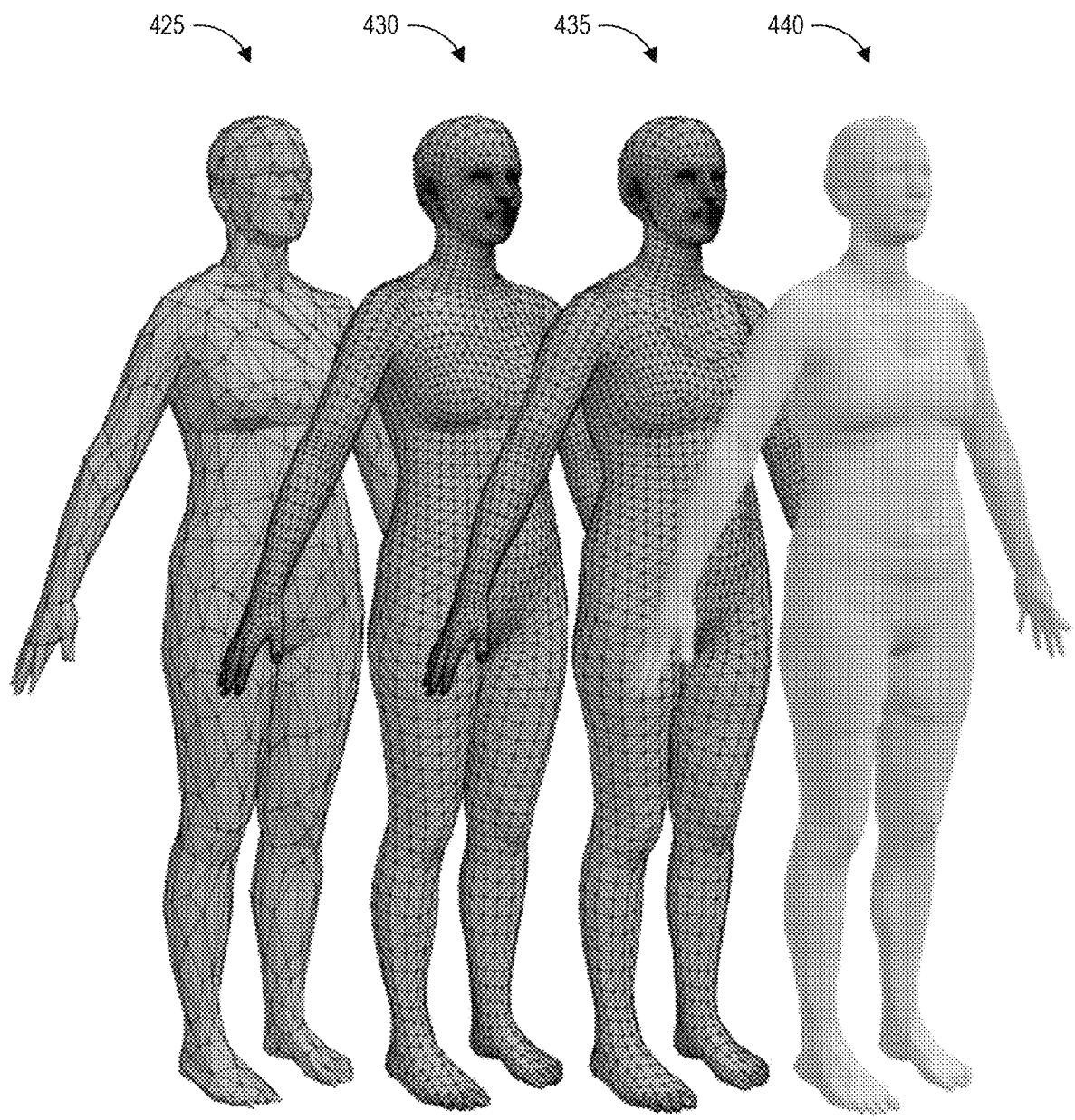

FIG. 4D depicts an estimated body shape 425 represented with 10 low-resolution shape basis vectors 420 and an estimated body shape 430 represented with 20 full-body high-resolution and 20 head basis vectors. FIG. 4D also depicts a personalized shape 435 representing the determined contours of the human depicted by the displacement map 420 used to displace the mesh of the estimated body shape 430. FIG. 4D also depicts a textured model 440 formed by the personalized shape 435 with the displacement map 420 applied.

Figure 4E:
FIG. 4E depicts examples of reposing a depiction of a human body using the data of FIGS. 4A-4D.

FIG. 4E depicts representations of the human depicted in the data illustrated in FIGS. 4A-4D morphed into multiple different poses. This illustrates the textured model 440 reposed and with the texturing of the texture map 415 applied.

In some examples, the data depicted in FIGS. 4A-4D can be generated from video sequences or laser scanning methods and used to train the shape detection model 225B. The data depicted in FIGS. 4A-4D can be used as the expected output data for an input of a single, 2D image depicting the human. Thus, the disclosed techniques can train the shape detection model 225B such that it can generate 3D body representations from a single image.

FIG. 4E depicts examples of reposing a depiction of a human body using the data of FIGS. 4A-4D.

Body Pose and Shape Estimation Examples

One example approach can train the pose detection model to identify a 2D array of joint locations in the input image, and then uses the shape detection model to fit a 3D body model to the identified joint locations. The pose detection model can be the DeepCut CNN (further described below) used to identify the joint locations and the shape detection model can be a linear regressor trained as described below. The DeepCut CNN jointly solves the tasks of detection and pose estimation: it infers the number of humans in a scene, identifies occluded body parts, and disambiguates body parts between people in close proximity of each other.

A DeepCut CNN is trained to partition and label an initial pool of body part candidates in an input image into subsets that correspond to sets of mutually consistent body part candidates and also abide to mutual consistency and exclusion constraints. DeepCut selects a subset of body parts from a set of body part candidates. Each such part detection includes the probabilities, its location, scale, and bounding box coordinates. Labeling refers to labeling each selected body part with one of a number of body part classes, e.g., "arm," "leg," "torso," while partitioning refers to identifying the body parts that belong to the same human (when there are multiple humans depicted in an image).

The DeepCut CNN adapts a Fast R-CNN ("FR-CNN") that takes as input an image and set of class-independent region proposals and outputs the softmax probabilities over all classes and refined bounding boxes. To adapt the FR-CNN for part detection it is altered it in two ways to form the DeepCut CNN: 1) it uses DPM-based part detectors for proposal generation and 2) increased detection region size, in that it upscales every bounding box by a fixed factor to capture more context around each part.

Figure 5A:
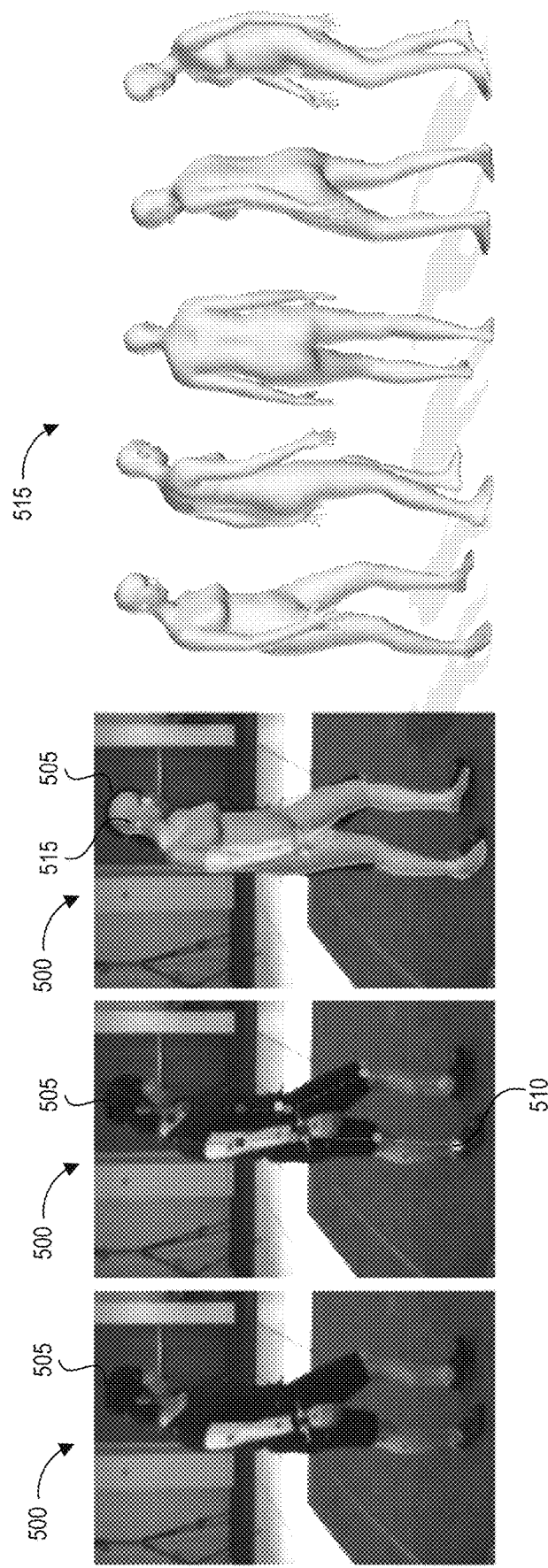
FIG. 5A illustrates an example of fitting body pose and shape to detected joint locations.

FIG. 5A depicts an overview of this approach. Given a single image 500 depicting a human 505, the machine learning system 224 uses a CNN-based method to predict 2D joint locations 510 (e.g., at block 310 of the process 300).

In FIG. 5A, the darker shades of gray denote high confidence in the joint locations 510. The machine learning system 224 then fits a 3D body model 515 to the joint locations 510 to estimate 3D body shape and pose (e.g., at block 320 of the process 300). FIG. 3A shows the fit body model 515 projected onto the image 500 over the human 505. This body model 515 is also shown from different viewpoints (rightmost poses shown in FIG. 5A).

For example, at block 310 the machine learning system 224 can take a single input image 500, and use the DeepCut CNN as the pose detection model 225A to predict 2D body joints, $J_{est}$. For each 2D joint, the CNN provides a confidence value, $w_i$. At block 320, the shape detection model 225B then fits a 3D body model, for example a body model in a SMPL or MOSH data set, such that the projected joints of the model minimize a robust weighted error term as described in more detail below with respect to equations (1) through (7). In this example the machine learning system 224 uses a SMPL model to take in the 2D image 500 and produce a posed 3D mesh 515.

The body model is defined as a function $M(\beta, \theta, \gamma)$, parameterized by shape $\beta$, pose $\theta$, and translation $\gamma$. The output of the function is a triangulated surface, M, with 6890 vertices in this example. Shape parameters are coefficients of a low-dimensional shape space, learned from a training set of thousands of registered scans. Here the machine learning system 224 uses one of three shape models: male, female, and gender-neutral. Since SMPL typically defines only male and female models, a gender-neutral model can be trained, for example, by using the male and female body shapes (e.g., 2000 of each) that were used to train the gendered SMPL models. If the gender is known, the machine learning system 224 uses the gender-appropriate model, if not it uses the gender-neutral body model.

The pose of the body is defined by a skeleton rig (e.g., with 23 joints), with pose parameters $\theta$ representing the axis-angle representation of the relative rotation between parts. $J(\beta)$ is the function that predicts 3D skeleton joint locations from body shape. In SMPL, joints are a sparse linear combination of surface vertices or, equivalently, a function of the shape coefficients. Joints can be put in arbitrary poses by applying a global rigid transformation. In the following, posed 3D joints are denoted as $R_\theta (J(\beta)_i)$, for joint i, where $R_\theta$ is the global rigid transformation induced by pose $\theta$. SMPL defines pose-dependent deformations; for the gender-neutral shape model, the presently disclosed techniques use the female deformations, which are general enough in practice. The SMPL model and DeepCut skeleton have slightly different joints. Thus, in one embodiment, DeepCut joints are associated with the most similar SMPL joints. A perspective camera model, defined by parameters K, is used to project SMPL joints onto the image 500.

Some previous methods produce 3D poses that are suboptimal due to interpenetration between body parts. An advantage of the presently disclosed 3D shape model is that it can detect and prevent this. Computing interpenetration, however, is expensive for complex, non-convex, surfaces like the body. The presently disclosed techniques thus approximate the body surface as a set of "capsules" each having a radius and an axis length. FIG. 5B shows the capsules used to approximate body models, showing an example body model 520 and that same model shape approximated by capsules 525.

The machine learning system 224 can train the shape detection model 225B as a regressor from model shape parameters to capsule parameters (axis length and radius). In reposing or morphing the body, the rendering engine 226 can pose the capsules according to $R_\theta$, the rotation induced by the kinematic chain. Specifically, the shape detection model 225B first fits 20 capsules, one per body part, excluding fingers and toes, to the body surface of the unposed or rest pose body model. Starting from capsules manually attached to body joints in the template, the shape detection model 225B first performs gradient-based optimization of their radii and axis lengths to minimize the bidirectional distance between capsules and body surface. The shape detection model 225B then learns a linear regressor from body shape coefficients, $\beta$, to the capsules' radii and axis lengths using cross-validated ridge regression. Once the regressor is trained, the procedure is iterated once more, initializing the capsules with the regressor output.

To fit the 3D pose and shape to the CNN-detected 2D joints, the shape detection model 225B minimizes an objective function that is the sum of five error terms: a joint-based data term, three pose priors, and a shape prior; that is $E(\beta, \theta)=$ $$E_J(\beta,\theta;K,J_{est}) + \lambda_\theta E_\theta(\theta) + \lambda_\alpha E_\alpha(\theta) + \lambda_{SD} E_{SD}(\theta;\beta) + \lambda_\beta E_\beta(\beta) \quad (1)$$

where K are camera parameters and $\lambda_\theta$, $\lambda_\alpha$, $\lambda_{sp}$, and $\lambda_\beta$ are scalar weights.

The joint-based data term penalizes the weighted 2D distance between estimated joints, $J_{est}$, and corresponding projected SMPL joints:

$$E_J(\beta, \theta; K, J_{est}) = \sum_{joint\ i} \omega_i \rho(\Pi_K(R_\theta(J(\beta)_i)) - J_{est,i}) \quad (2)$$

where $\Pi_K$ is the projection from 3D to 2D induced by a camera with parameters K. The shape detection model 225B weights the contribution of each joint by the confidence of its estimate, $w_i$, provided by the CNN of the pose detection model 225A. For occluded joints, this value is usually low; pose in this case is driven by pose priors as defined by equation (3) below. A pose prior represents the reasonable or expectable limits on human joint motion ranges; imposing such a prior over computer-generated human model poses can serve to prevent the generation of invalid poses (e.g., poses that would not be achievable due to typical human joint dynamics). The shape detection model 225B can introduce a pose prior that penalizes elbows and knees that bend unnaturally, according to equation (3):

$$E_\alpha(\theta) = \sum_i \exp(\theta_i), \quad (3)$$

where i sums over pose parameters (rotations) corresponding to the bending of knees and elbows. The exponential strongly penalizes rotations violating natural constraints (e.g. elbow and knee hyperextending). Note that when the joint is not bent, $\theta_i$ is zero. Negative bending is natural and is not penalized heavily while positive bending is unnatural and is penalized more.

The pose prior can be trained using the Carnegie Mellon University ("CMU") PanopticStudio dataset that includes at least 480 VGA videos, 31 HD videos, 3D body pose, and calibration data relating to a number of humans that were recorded, alone or interacting together, inside of a dome. Given that poses vary significantly, it can be important to represent the multi-modal nature of the data, yet also keep the prior computationally tractable. To build a prior, the present disclosure use poses obtained by fitting the SMPL model to the CMU marker data using a MOSH technique. The shape detection model 225B then fits a mixture of Gaussians to approximately 1 million poses, spanning multiple (e.g., 100) subjects. Using the mixture model directly in this optimization framework can be problematic computationally because of the need to optimize the negative logarithm of a sum. Thus, the shape detection model 225B can approximate the sum in the mixture of Gaussians by a max operator:

$$E_\theta(\theta) \equiv -\log \sum_j \left(g_j N(\theta; \mu_{\theta,j}, \Sigma_{\theta,j})\right) \approx -\log\left(\max_j \left(cg_j N(\theta; \mu_{\theta,j}, \Sigma_{\theta,j})\right)\right) \quad (4)$$

$$= \min_j \left(-\log(cg_j N(\theta; \mu_{\theta,j}, \Sigma_{\theta,j}))\right) \quad (5)$$

where $g_j$ are the mixture model weights of N=8 Gaussians, and c a positive constant required by this solver implementation. Although $E_\theta$ is not differentiable at points where the mode with minimum energy changes, the shape detection model 225B can approximate its Jacobian by the Jacobian of the mode with minimum energy in the current optimization step. With respect to the Jacobian, if m=n, then f is a function from $\mathbb{R}^n$ to itself and the Jacobian matrix is a square matrix. Its determinant is known as the Jacobian determinant, occasionally referred to as "the Jacobian."

The shape detection model 225B also defines an interpenetration term that exploits the capsule approximation shown in FIG. 5B. The error term is related to the intersection volume between "incompatible" capsules (e.g., capsules that do not intersect in natural poses). Since the volume of capsule intersections is not simple to compute, the capsules are further simplified into spheres with centers $C(\theta, \beta)$ along the capsule axis and radius $r(\beta)$ corresponding to the capsule radius. The penalty term is inspired by the mixture of 3D Gaussians model, with a 3D isotropic Gaussian with $\sigma(\beta)$ =$r(\beta)/3$ for each sphere, and the penalty defined as a scaled version of the integral of the product of Gaussians corresponding to "incompatible" parts:

$$E_{sp}(\theta; \beta) = \sum_i \sum_{j \in I(i)} \exp\left(\frac{\|C_i(\theta, \beta) - C_j(\theta, \beta)\|^2}{\sigma_i^2(\beta) + \sigma_j^2(\beta)}\right) \quad (6)$$

where the summation is over all spheres i and I(i) are the spheres incompatible with i. The term penalizes, but does not strictly avoid, interpenetrations. As desired, however, this term is differentiable with respect to pose and shape. This term is typically not used in optimizing shape since this may bias the body shape to be thin to avoid interpenetration.

The shape detection model 225B can also use a shape prior $E_\beta(\beta)$, defined as $$E_\beta(\beta) = \beta^T \Sigma_\beta^{-1} \beta \quad (7)$$

where $\Sigma_\beta^{-1}$ is a diagonal matrix with the squared singular values estimated via Principal Component Analysis from the shapes in the SMPL training set. The shape coefficients β are zero-mean by construction.

The present approach assumes that camera translation and body orientation are unknown for the camera that captured the image, however, it requires that the camera focal length or its rough estimate is known. The camera translation is initialized (equivalently γ) by assuming that the human is standing parallel to the image plane. Specifically, this approach estimates the depth via the ratio of similar triangles, defined by the torso length of the mean SMPL shape and the predicted 2D joints. Since this assumption is not always true, this approach further refines this estimate by minimizing $E_J$ over the torso joints alone with respect to camera translation and body orientation. To do so, the shape detection model 225B keeps β fixed to the mean shape during this optimization. After estimating camera translation, the body model is fit by minimizing Eq. (1) above in a staged approach. The staged approach can involve, for example, starting with a high value for $\lambda_\theta$ and $\lambda_\beta$ and gradually decreasing them in the subsequent optimization stages in order to avoid local minima.

When the subject is captured in a side view, assessing in which direction the body is facing might be ambiguous. To address this, the shape detection model tries two initializations when the 2D distance between the CNN-estimated 2D shoulder joints is below a threshold: first with body orientation estimated as above and then with that orientation rotated by 180 degrees. Finally the shape detection model 225B picks the body model that fits with the lowest $E_J$ value.

The shape detection model 225B can minimize Eq. (1) using Powell's dogleg method. This is an algorithm proposed by Michael J. D. Powell for finding a local minimum of a function. Optimization for a single image can take less than 1 minute on a common desktop computer.

Terminology

Implementations disclosed herein provide systems, methods and apparatus for training and using machine learning models. The disclosed training and prediction models can be implemented in machine learning systems or artificial intelligence systems, including image augmentation systems. As used herein, such systems include electronic memory storing computer-executable instructions for performing the described training and/or prediction operations and hardware processors that execute the instructions.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a graphics processing unit ("GPU"), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor device can be a microprocessor, but in the alternative, the processor device can be a controller, microcontroller, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The terms "approximately," "about," and "substantially" as used herein represent an amount close to the stated amount that still performs a desired function or achieves a desired result. For example, in some embodiments, as the context may dictate, the terms "approximately," "about," and "substantially" may refer to an amount that is within less than or equal to 10% of a pre-defined threshold or amount. The term "generally" as used herein represents a value, amount, or characteristic that predominantly includes or tends toward a particular value, amount, or characteristic.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
    a data repository storing an image augmentation rule that specifies a model pose of a human body, wherein the image augmentation rule defines at least a threshold value used to determine that an augmented image is to be generated, and wherein the model pose of a human body is represented by a first set of joint vertices; and
    one or more processors in communication with the data repository, the one or more processors programmed with executable instructions to at least:
        receive image data for an image depicting a scene including a human;
        identify a second set of joint vertices representing a pose of the human in the image using a pose detection model to analyze the image data;
        determine that a difference between the pose of the human in the image and the model pose specified in the image augmentation rule does not satisfy the threshold value defined in the augmentation rule, wherein the difference is determined based at least in part on a comparison of the first set of joint vertices and the second set of joint vertices; and
        in response to determining that the difference does not satisfy the threshold value defined by the augmentation rule:

identify a shape of the human in the image using a shape detection model to analyze the image data;
identify semantic content of the scene in the image using a scene analysis model to analyze the image data; and
generate an augmented image of the human in the scene in which the shape of the human body is moved into the model pose and the semantic content of the scene is maintained with respect to the shape of the human body moved into the model pose.

2. The system of claim 1, wherein the data repository stores a set of body models representing different shapes of human bodies, and wherein the one or more processors are programmed to use the shape detection model to correlate one body model of the body models with the shape of the human in the image data.

3. The system of claim 2, wherein the body model is represented by a set of skin vertices, and wherein the one or more processors are programmed to move the shape of the human into the model pose by applying blend weights to the set of skin vertices.

4. The system of claim 2, wherein the one or more processors are programmed to at least:
generate a texture map representing skin, hair, and clothing depicted on the human in the image based at least in part on pixel values in the image; and
apply the texture map to the body model to render the human in the model pose.

5. The system of claim 2, wherein the one or more processors are programmed to at least:
use the shape detection model to fit the body model to the locations of the second set of joint vertices representing the pose of the human in the image.

6. The system of claim 5, wherein the pose analysis model comprises a convolutional neural network, wherein the shape detection model employs linear regression, and wherein the scene detection model comprises a convolutional neural network.

7. The system of claim 1, wherein, to maintain the semantic content of the scene with respect to the shape of the human body moved into the model pose, the one or more processors are programmed to at least fill in estimated values of background pixels in locations originally occupied by the human.

8. The system of claim 1, wherein the scene analysis model is trained to recognize a foreground object and wherein, to maintain the semantic content of the scene with respect to the shape of the human body moved into the model pose, the one or more processors are programmed to at least maintain the foreground object in front of the shape of the human body moved into the model pose.

9. A computer-implemented method comprising:
receiving image data for an image depicting a scene including a human;
accessing an image augmentation rule that specifies a model pose of a human body, wherein the image augmentation rule defines at least a threshold value used to determine that an augmented image is to be generated, and wherein the model pose of a human body is represented by a first set of joint vertices;
identifying a second set of joint vertices representing a pose of the human in the image using a pose detection model applied to the image data;
determining that a difference between the pose of the human in the image and the model pose specified in the image augmentation rule does not satisfy the threshold value defined in the augmentation rule, wherein the difference is determined based at least in part on a comparison of the first set of joint vertices and the second set of joint vertices; and
in response to determining that the difference does not satisfy the threshold value defined by the augmentation rule:
using a shape detection model to identify a shape of the human in the image;
using a scene analysis model to identify semantic content of the scene in the image; and
generating an augmented image of the human in the scene in which the shape of the human body is moved into the model pose and the semantic content of the scene is maintained with respect to the shape of the human body moved into the model pose.

10. The computer-implemented method of claim 9, further comprising:
accessing a data repository storing a set of body models representing different shapes of human bodies; and
using the shape detection model to correlate one body model of the body models with the shape of the human in the image data.

11. The computer-implemented method of claim 10, further comprising:
using a convolutional neural network as the pose detection model to identify the second set of joint vertices representing the pose of the human depicted in the image; and
using linear regression as the shape detection model to fit the body model to the second set of joint vertices.

12. The computer-implemented method of claim 10, wherein the body model is represented by a set of skin vertices, the computer-implemented method further comprising moving the shape of the human into the model pose by applying blend weights to the set of skin vertices.

13. The computer-implemented method of claim 9, wherein, to maintain the semantic content of the scene with respect to the shape of the human body moved into the model pose, the computer-implemented method further comprises one or both of filling in estimated values of background pixels in locations originally occupied by the human and maintaining a foreground object in front of the shape of the human body moved into the model pose.

14. A non-transitory computer-readable medium storing instructions that, when executed by one or more processors, cause the one or more processors to at least:
receive image data for an image depicting a scene including a subject;
access an image augmentation rule that specifies a model pose of a subject body, wherein the image augmentation rule defines at least a threshold value used to determine that an augmented image is to be generated, and wherein the model pose of a subject body is represented by a first set of joint vertices;
identify a second set of joint vertices representing a pose of the subject in the image using a pose detection model to analyze the image data;
use a shape detection model to identify a shape of the subject in the image;
use a scene analysis model to identify semantic content of the scene in the image;
determine a difference between the model pose of a subject body and the pose of the subject identified from the image data does not satisfy the threshold value defined in the augmentation rule, wherein the difference is determined based at least in part on a comparison of the first set of joint vertices and the second set of joint vertices; and in response to determining that the difference does not satisfy the threshold value defined by the augmentation rule:

generate, based at least in part on the comparison, an augmented image of the subject in the scene, wherein generating the augmented image comprises:

morph the shape of the subject in the scene into a new shape reflecting the model pose of the subject body;

modify the semantic content of the scene in accordance with the new shape; and store image data for the augmented image that includes the subject repositioned in the new shape and the semantic content modified in accordance with the new shape.

15. The non-transitory computer-readable medium of claim 14 storing instructions that, when executed by the one or more processors, further cause the one or more processors to at least:

access a data repository storing a set of body models representing different shapes of subject bodies; and use the shape detection model to correlate a body model of the body models with the shape of the subject in the image data.

16. The non-transitory computer-readable medium of claim 15 storing instructions that, when executed by the one or more processors, further cause the one or more processors to at least:

use a convolutional neural network as the pose detection model to identify the second set of joint vertices representing the pose of the subject depicted in the image; and use linear regression as the shape detection model to fit the body model to the second set of joint vertices.

17. The non-transitory computer-readable medium of claim 15, wherein the body model is represented by a set of skin vertices, and wherein the non-transitory computer-readable medium stores instructions that, when executed by the one or more processors, further cause the one or more processors to morph the shape of the subject in the scene into the new shape by applying blend weights to the set of skin vertices of the body model.

18. The non-transitory computer-readable medium of claim 17 storing instructions that, when executed by the one or more processors, further cause the one or more processors to at least:

use pixel values of the image to generate a texture map representing skin, hair, and clothing depicted on the subject in the scene; and apply the texture map to the body model to render the subject in the model pose.

19. The non-transitory computer-readable medium of claim 17 storing instructions that, when executed by the one or more processors, further cause the one or more processors to at least:

use pixel values of the image to generate a displacement map representing contours of a body surface of the subject in the scene; and apply the displacement map to the body model to render the contours of the body surface in the model pose.

20. The non-transitory computer-readable medium of claim 14, wherein to modify the semantic content of the scene in accordance with the new shape, the non-transitory computer-readable medium stores instructions that, when executed by the one or more processors, cause the one or more processors to conduct one or both of filling in estimated values of background pixels in locations originally occupied by the subject and maintaining a foreground object in front of the shape of the subject body moved into the model pose.

* * * * *